United States Patent
Iwashita

(10) Patent No.: US 10,546,256 B2
(45) Date of Patent: Jan. 28, 2020

(54) SECURITY PLAN SUPPORT METHOD, SECURITY PLAN SUPPORT DEVICE AND RECORDING MEDIUM

(71) Applicant: FUJITSU LIMITED, Kawasaki-shi, Kanagawa (JP)

(72) Inventor: Hiroaki Iwashita, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 1018 days.

(21) Appl. No.: 14/967,622

(22) Filed: Dec. 14, 2015

(65) Prior Publication Data

US 2016/0239787 A1    Aug. 18, 2016

(30) Foreign Application Priority Data

Feb. 12, 2015   (JP) ................. 2015-025859

(51) Int. Cl.
*G06Q 10/06* (2012.01)
*G06Q 30/00* (2012.01)

(52) U.S. Cl.
CPC . *G06Q 10/063118* (2013.01); *G06Q 10/0635* (2013.01); *G06Q 30/0185* (2013.01)

(58) Field of Classification Search
CPC ....... G06Q 10/0635; G06Q 10/063118; G06Q 30/0185
See application file for complete search history.

(56) References Cited

U.S. PATENT DOCUMENTS

2013/0318616 A1 * 11/2013 Christodorescu ....... G06F 21/00
726/25

OTHER PUBLICATIONS

Conitzer et al., Security Scheduling for Real-world Networks, Proceedings of the 12th International Conference on Autonomous Agents and Multiagent Systems (AAMA 2013), Ito Jonker, Gini, and Shehory (eds.), May, 6-10, 2013 (Year: 2013).*
Jain et al., A Double Oracle Algorithm for Zero-Sum Security Games on Graphs, Proc. of 10th Int. Conf. on Autonomous Agents and Multiagent Systems (AAMAS 2011), Turner, Yolum, Sonenberg and Stone (eds.), May, 2-6, 2011, Taipei, Taiwan (Year: 2011).*
M. Jain, D. Korzhyk, O. Vanek, V. Conitzer, M. Pechoucek, and M. Tambe, "A Double Oracle Algorithm for Zero-Sum Security Games on Graphs", Autonomous Agents and Multiagent System, Taipei, Taiwan, May 2-6, 2011.
M. Jain, V. Conitzer, and M. Tambe, "Security Scheduling for Real-world Networks", Autonomous Agents and Multiagent System, Saint Paul, USA, May 6-10, 2013.

* cited by examiner

*Primary Examiner* — Nadja N Chong Cruz
(74) *Attorney, Agent, or Firm* — Fujitsu Patent Center

(57) ABSTRACT

In a security plan support method, a computer calculates an expected value of a loss that will be incurred when an intruder reaches a target with respect to each of a plurality of targets that are targets for the intruder in a route graph that depicts movement routes within the security area; specifies a security line that crosses the minimum number of edges of the route graph in the case of separating a target that has the greatest expected value of the loss from positions that is an intrusion position or positions of the intruder in the route graph; and calculates a security probability which minimizes the probability of the intruder intruding into the target side of the security line according to the route graph, the security line, and the number of the security guards.

5 Claims, 26 Drawing Sheets

| DEPLOYMENT PATTERN | SELECTION PROBABILITY |
|---|---|
| E(17, 25), E(38, 39), E(40, 49) | 21/52 |
| E(13, 23), E(15, 20), E(16, 22) | 20/52 |
| E(13, 23), E(38, 39), E(48, 49) | 3/52 |
| E(13, 23), E(17, 25), E(48, 49) | 3/52 |
| E(12, 16), E(17, 25), E(38, 39) | 2/52 |
| E(13, 23), E(17, 25), E(38, 39) | 1/52 |
| E(5, 13), E(9, 19), E(10, 15) | 1/52 |
| E(7, 14), E(8, 18), E(10, 15) | 1/52 |

FIG. 2

| TARGET IDENTIFICATION NUMBER | NODE NUMBER | LOSS Ut | CALCULATION RESULT OF DEGREE OF RISK | | | |
|---|---|---|---|---|---|---|
| | | | 1ST ROUND | 2ND ROUND | 3RD ROUND | 4TH ROUND |
| 1 | $V_{28}$ | 2 | 2.000 | 2.000 | 1.290 | 1.154 |
| 2 | $V_{32}$ | 4 | 4.000 | * 4.000 | * 2.581 | * 2.308 |
| 3 | $V_{37}$ | 5 | * 5.000 | 1.250 | * 2.581 | * 2.308 |
| 4 | $V_{46}$ | 3 | 3.000 | 0.750 | 1.548 | 1.385 |

F I G. 6

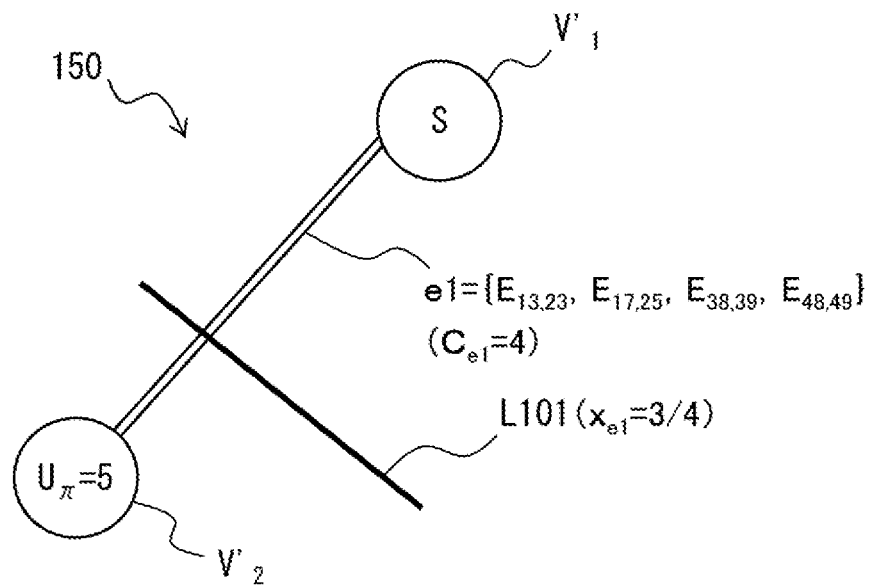
F I G. 7 B

F I G. 14

| TARGET IDENTIFICATION NUMBER | NODE NUMBER | LOSS Ut | CALCULATION RESULT OF DEGREE OF RISK ||||| 
| --- | --- | --- | --- | --- | --- | --- | --- |
| | | | 1ST ROUND | 2ND ROUND | 3RD ROUND | 4TH ROUND | 5TH ROUND |
| 1 | $V_{28}$ | 2 | 2.000 | 2.000 | 2.000 | 2.000 | 1.154 |
| 2 | $V_{32}$ | 4 | 4.000 | * 4.000 | 2.581 | * 2.707 | * 2.308 |
| 3 | $V_{37}$ | 5 | * 5.000 | 1.250 | 2.581 | * 2.707 | * 2.308 |
| 4 | $V_{46}$ | 3 | 3.000 | 3.000 | * 3.000 | * 2.707 | 1.731 |

SECURITY PLAN SUPPORT METHOD, SECURITY PLAN SUPPORT DEVICE AND RECORDING MEDIUM

CROSS-REFERENCE TO RELATED APPLICATION

This application is based upon and claims the benefit of priority of the prior Japanese Patent Application No. 2015-25859, filed on Feb. 12, 2015, the entire contents of which are incorporated herein by reference.

FIELD

The embodiments discussed herein are related to a security plan support method, a security plan support device, and a recording medium.

BACKGROUND

For security within a security area in a city, facility, etc., it is important to deploy security guards so that an expected value of a loss that will be incurred by an intruder reaching a security target is minimal. In contrast, for security provided by security guards, in terms of labor costs it is desirable that a limited number of security guards be efficiently deployed. Therefore, deployment of security guards is determined with reference to information of a deployment pattern, etc. that is provided by an information providing device.

The information providing device calculates a plurality of deployment patterns and a selection probability of each deployment pattern according to a route graph that depicts movement routes within a security area and security conditions, and outputs to a display device, etc. the calculation result together with the route graph. The security conditions include an intrusion position of an intruder on the movement route, a position or a range of a security target, a loss that is incurred when the intruder reaches the security target, and the number of security guards. In addition, when outputting the deployment pattern or the selection probability to the display device, etc., deployment locations (edges) of the security guards in the route graph are highlighted by way of, for example, changing colors thereof.

The above deployment pattern and selection probability are obtained by repeating linear programming and mixed integer programming (see non-patent documents 1 and 2).

Non-patent document 1: M. Jain, D. Korzhyk, O. Vanek, V. Conitzer, M. Pechoucek, and M. Tambe. A Double Oracle Algorithm for Zero-Sum Security Games on Graphs. In AAMAS, 2011.

Non-patent document 2: M. Jain, V. Conitzer, and M. Tambe. Security Scheduling for Real-world Networks. In AAMAS, 2013.

SUMMARY

A security plan support method according to an aspect of the embodiments is a security plan support method. In this method, a computer executes a process including: calculating an expected value of a loss that will be incurred when an intruder reaches a target with respect to each of a plurality of targets that are targets for the intruder in a route graph that depicts movement routes within the security area, specifying a security line that crosses the minimum number of edges of the route graph in the case of separating the target that has the greatest expected value of the loss from one or a plurality of positions that is an intrusion position or positions of the intruder in the route graph, and calculating a probability that the intruder will intrude into the target side of the security line according to the route graph, the security line, and the number of security guards.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a schematic diagram illustrating an example of a data structure of security plan information.

FIG. 6 is a schematic diagram illustrating a calculation result of a degree of risk of each target in the embodiment (first example).

FIG. 7B is a schematic diagram illustrating the result of the processes in the first performance of steps S6 and S7 in the embodiment (first example).

FIG. 14 is a schematic diagram illustrating a calculation result of a degree of risk of each target in the embodiment (second example).

DESCRIPTION OF EMBODIMENTS

In a technique using the above information providing device, it takes a lot of time to calculate a combination of deployment patterns that has a high security efficiency and to calculate the selection probability thereof, and a considerable processing load is imposed.

In an aspect, the object of embodiments is to reduce a probability calculation load with respect to deployment of security guards.

The embodiment is directed to generating security plan information for supporting development of a security plan, using a security plan support device such as a computer. The security plan support device calculates the optimum solution of the security probability when security guards are deployed on a movement route within a security area, and generates security plan information that includes the security probability. In addition, the security plan support device supports determination of deployment of the security guards by displaying and providing the generated security plan information on a display device, etc.

The security plan support device calculates a security probability with respect to deployment of the security guards, that is, the probability of preventing the intruder from reaching a security target (target) according to a route graph that depicts the movement routes within the security area and security conditions. In addition, the security plan support device displays the calculated security probability on a display device such as a liquid crystal display together with a security graph that is obtained by adding the security conditions to the route graph.

The route graph is a graph G=(V,E) in which the movement route within the security area is depicted by a set V of vertices (nodes) and a set E of edges. In addition, the security conditions include an intrusion position of the intruder on the movement routes, a position or a range of a security target on the movement routes, a loss that is incurred when the intruder reaches the security target, and the number of security guards to be deployed. Note that the position or the range of the security target is a position or a range that is targeted by the intruder on the movement routes. In addition, the loss that is incurred when the intruder reaches the security target is a relative value of the loss or damage that may be incurred by the intruder reaching the targeted position or range.

Figure 1:
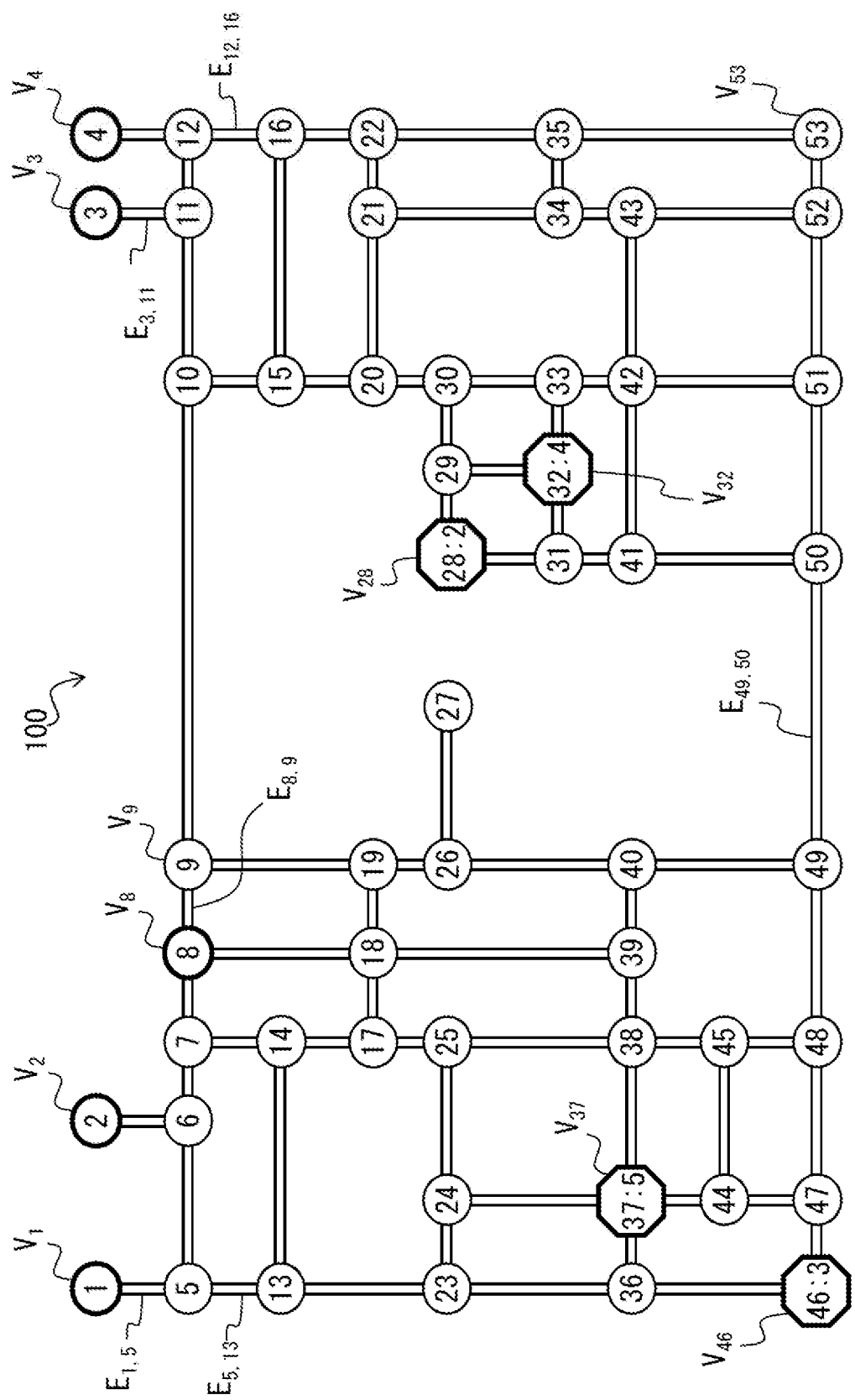
FIG. 1 is a schematic diagram illustrating an example of a security graph.

FIG. 1 is a schematic diagram illustrating an example of the security graph.

As illustrated in FIG. 1, a security graph 100 is a graph that is obtained by adding security conditions to the route graph G. In this security graph 100, each circle or octagon that encircles a number m represents a vertex $V_m$ and a double line that connects two vertices $V_i$ and $V_j$ represents an edge $E_{i,j}$.

In the security graph 100, five vertices $V_1$, $V_2$, $V_3$, $V_4$, and $V_8$, which each are denoted by a circle with a thick line, are vertices that are set to intrusion positions of the intruder according to the security conditions.

In contrast, in the security graph 100, four vertices $V_{28}$, $V_{32}$, $V_{37}$, and $V_{46}$, which each are denoted by an octagon, are vertices that are set to security targets according to the security conditions. In a numerical value "m:Ut" of each of the vertices $V_{28}$, $V_{32}$, $V_{37}$, and $V_{46}$, which are set to the security targets, m represents a serial number of the vertex and Ut represents a loss that is incurred when the intruder reaches the vertex.

Note that in FIG. 1, the vertex that is set to the intrusion position is depicted by a circle with a thick line and the vertex that is set to the security target is depicted by an octagon in order to distinguish them from the other vertices; however, in a case of displaying the vertices on a display device, etc., the method of distinguishing the vertices is not limited to this, and a method such as changing display colors thereof may also be employed.

Hereinafter, an example and an embodiment, etc. of the present invention will be described, taking as an example a case in which three security guards provide security within a security area that is depicted by the security graph 100 illustrated in FIG. 1. Note that in the following description, the five vertices $V_1$, $V_2$, $V_3$, $V_4$, and $V_8$, which are set to the intrusion positions, are also referred to as sources. In addition, in the following description, the four vertices $V_{28}$, $V_{32}$, $V_{37}$, and $V_{46}$, which are set to the security targets, are also referred to as targets.

Example

Figure 3:
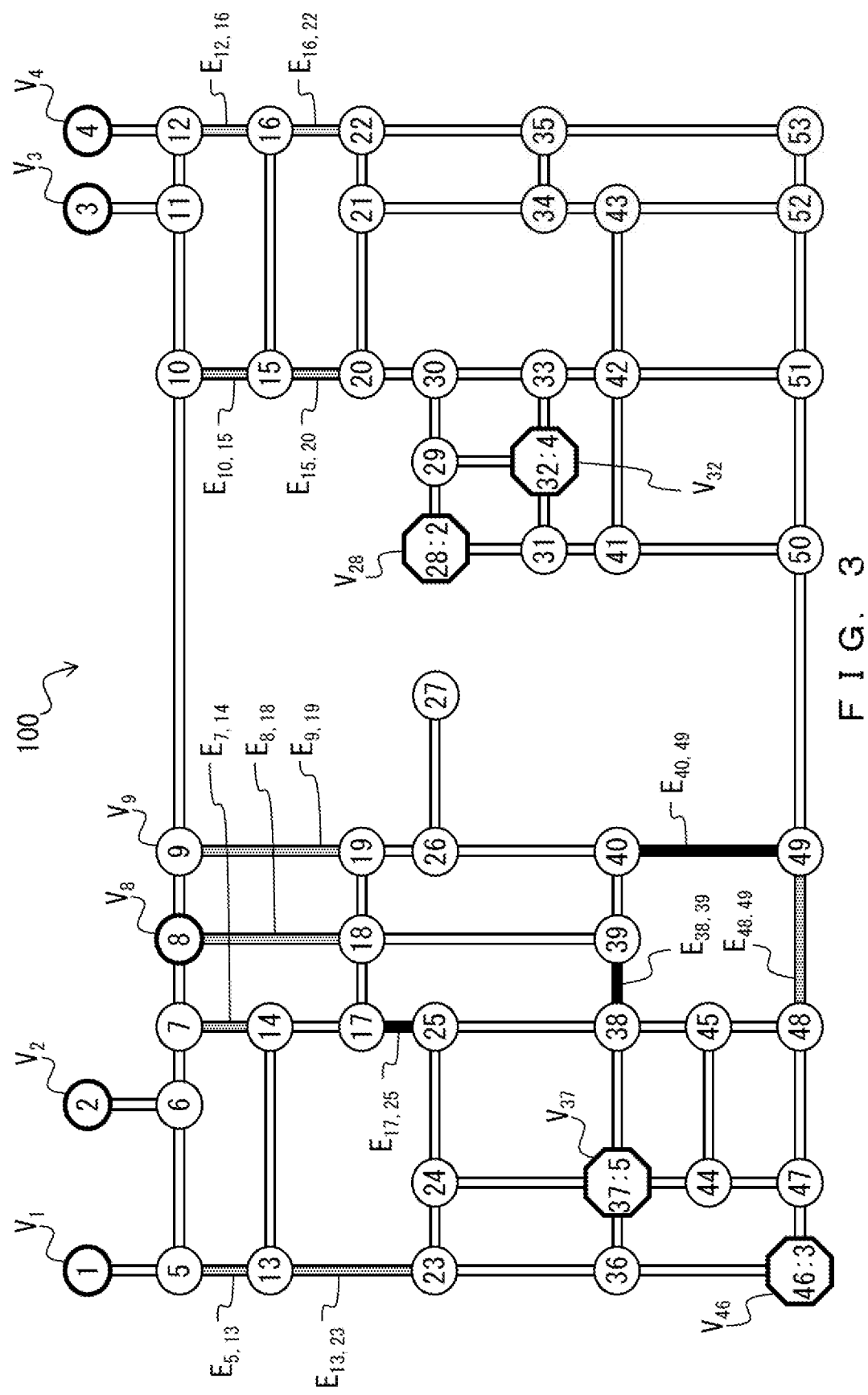
FIG. 3 is a schematic diagram illustrating an example of the display method of the security plan information.

FIG. 2 is a schematic diagram illustrating an example of a data structure of the security plan information. FIG. 3 is a schematic diagram illustrating an example of the display method of the security plan information.

A solution for deployment of security guards in a case in which there exists a plurality of targets as in the case of the security graph 100 illustrated in FIG. 1 is obtained by repeating linear programming and mixed integer programming. Here, a detailed description of the calculation method will be omitted; however, the solution for deployment of the security guards in the security graph 100, the solution being obtained using the method of this example, is calculated in the manner illustrated in FIG. 2. Note that in FIG. 2, the edge $E_{i,j}$ is expressed as E(i,j).

That is, in the method of this example, information on deployment of the security guards (hereinafter also referred to as "security plan information") is provided by including deployment patterns which are each a set of three edges on which the security guards are deployed and including the selection probability of each pattern. Information illustrated in FIG. 2 indicates that the security probability is greatest when security is provided in changing deployment patterns so that eight deployment patterns are selected with their respective selection probabilities.

As illustrated in FIG. 3, the security plan information illustrated in FIG. 2 is provided to an operator, etc. by changing the color of the deployment locations (edges) of the security guards in the security graph 100. In FIG. 3, edges $E_{17,25}$, $E_{38,39}$, and $E_{40,49}$ that are depicted by thick lines collectively indicate one deployment pattern that is selected from the eight deployment patterns. In addition, hatched edges $E_{5,13}$, $E_{7,14}$, $E_{8,18}$, $E_{9,19}$, $E_{10,15}$, $E_{12,16}$, $E_{13,23}$, $E_{15,20}$, and $E_{16,22}$ indicate edges that are included in the rest of the deployment patterns.

However, the security plan information illustrated in FIG. 2 is obtained, for example, by extracting a plurality of groups of edges (deployment patterns) according to the number of security guards from the security graph 100 and calculating the optimum combination of deployment patterns by changing combinations of the deployment patterns. Therefore, it takes a lot of time to calculate the combination of the deployment patterns and to calculate selection probabilities of the deployment patterns, and a great processing load is imposed on the device.

In addition, as illustrated in FIG. 3, in the case of highlighting the edges that are specified as edges to which the security guards are deployed, even though the deployment locations of the security guards in the security graph 100 are identified, the reasons other than the selection probability why the deployment has been selected are unknown. In addition, the relationship between the highlighted three edges and the security probability cannot be known by just looking at the display. Therefore, it takes a lot of time and trouble for an expert or an operator to evaluate an appropriateness of the deployment locations of the security guards according to the information illustrated in FIG. 2 and the information illustrated in FIG. 3. Therefore, it takes a lot of time and trouble to confirm the propriety of the security plan and to modify the security plan, such as determination of deployment of the security guards, according to the provided security plan information.

In contrast, in the embodiments as described below, a minimum cut that divides the security graph 100 (route graph G) is used so that the deployment locations of the security guards and the reasons for such deployment are made clear and the deployment locations of the security guards are easily evaluated. In addition, in the embodiments, a target that has the greatest degree of risk is focused on, the security probability is calculated so that the degree of risk of the target is reduced, and therefore the calculation amount is reduced and the calculation load is reduced. Note that the degree of risk in the present specification indicates an expected value of a loss that will be incurred when the intruder reaches the target. In addition, the security probability in the present specification indicates the probability of preventing the intruder from reaching (intruding into) the target.

Embodiment

Figure 4:
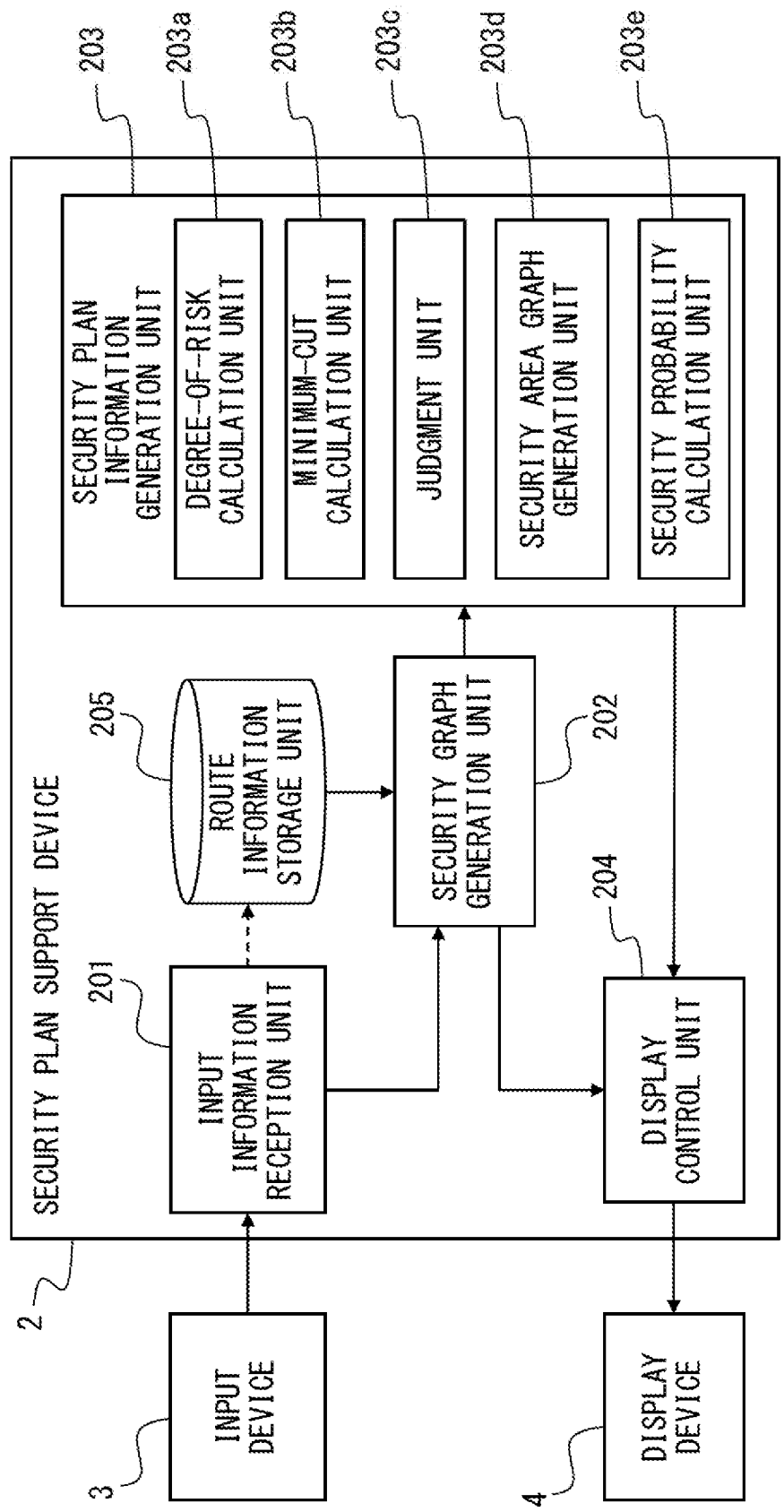
FIG. 4 is a block diagram illustrating a functional configuration of a security plan support device according to an embodiment of the present invention.

FIG. 4 is a block diagram illustrating a functional configuration of the security plan support device according to an embodiment of the present invention.

As illustrated in FIG. 4, a security plan support device 2 according to the embodiment includes an input information reception unit 201, a security graph generation unit 202, a security plan information generation unit 203, a display control unit 204, and a route information storage unit 205. In addition, the security plan support device 2 further includes a storage unit (not illustrated) such as a buffer that temporarily stores data, etc. that is calculated in the course of generating the security plan information.

The input information reception unit 201 receives information that is input via an input device 3 such as a mouse and a keyboard. Examples of the received information include graph information that indicates the number of vertices and a connection relationship that are used for generating a security graph, security conditions, etc.

The security graph generation unit 202 generates the security graph 100 using information that is received by the input information reception unit 201, and route information, etc. that is stored in the route information storage unit 205.

The security plan information generation unit 203 generates security plan information that includes security probabilities according to the generated security graph 100 and the number of security guards to be deployed.

The display control unit 204 displays on a display device 4 the security graph 100 that is generated by the security graph generation unit 202 and the security plan information, etc. that are generated by the security plan information generation unit 203.

The route information storage unit 205 stores route information that is used for generating the security graph 100 and a route graph etc. that is generated in advance.

In addition, the security plan information generation unit 203 in the security plan support device 2 includes a degree-of-risk calculation unit 203a, a minimum-cut calculation unit 203b, a judgment unit 203c, a security area graph generation unit 203d, and a security probability calculation unit 203e.

The degree-of-risk calculation unit 203a calculates the degree of risk of each target in the security graph 100. In the embodiment, the expected value of a loss Ut in a case in which it is assumed that the target is attacked is set as the degree of risk.

The minimum-cut calculation unit 203b calculates the minimum cut that separates a set of the targets that have the greatest degree of risk in the security graph 100 from a set S of sources.

Every time the minimum-cut calculation unit 203b calculates the minimum cut, the judgement unit 203c compares a minimum cut set (combination of all the edges that a closed curve which indicates the minimum cut crosses) with elements of a set E' that is stored in the storage unit, not illustrated. Then, in a case in which the minimum cut set does not exist in the set E', the minimum cut set is added to the set E'. In contrast, in a case in which the minimum cut set exists in the set E', security plan information that includes the security probability that has been calculated most recently by the security probability calculation unit 203e is output to the display control unit 204.

The security area graph generation unit 203d divides the security graph 100 into a plurality of areas by the elements of the set E' and generates a security area graph in which each area is set to a vertex.

The security probability calculation unit 203e solves the optimization problem with respect to the security probability on the security area graph and updates a security plan X that is stored in the storage unit, not illustrated.

Next, with reference to FIGS. 5A and 5B, procedures of security probability calculation using the security plan support device 2 will be described. Note that in the following description, a closed curve that indicates a minimum cut is also referred to as a minimum cut line.

Figure 5A:
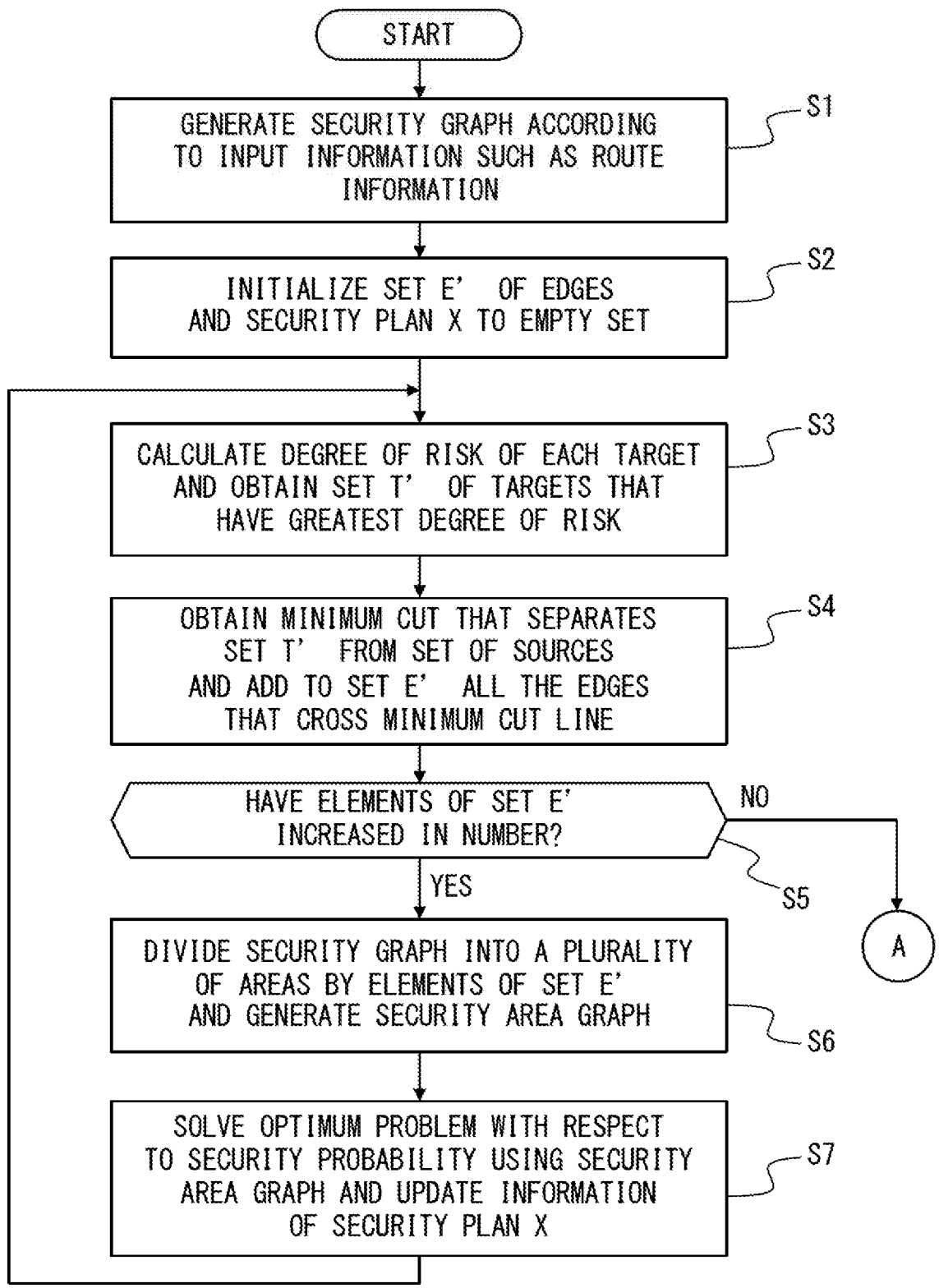
FIG. 5A is a flowchart (part 1) illustrating a security plan support method according to an embodiment of the present invention.

FIG. 5A is a flowchart (part 1) illustrating a security plan support method according to an embodiment of the present invention. FIG. 5B is a flowchart (part 2) illustrating the security plan support method according to the embodiment of the present invention.

When security plan information is generated and provided by the security plan support device 2, as illustrated in FIG. 5A, first, the security graph 100 is generated according to input information, etc. (step S1). Step 1 is cooperatively performed by the input information reception unit 201, the security graph generation unit 202, and the route information storage unit 205. An operator of the security plan support device 2 operates the input device 3 and inputs information of the route graph G=(V,E), security conditions, etc., which is is sent to the security graph generation unit 202. The security conditions include the set S of sources, a set T of targets, the loss Ut that is incurred when a target is attacked (when the intruder reaches the target), and the number of security guards k. The security graph generation unit 202 generates the security graph 100 as illustrated in FIG. 1 according to the input information and the route information, etc. that is stored in the route information storage unit 205. In addition, the security graph generation unit 202 displays on the display device 4 the generated security graph 100 via the display control unit 204.

When the security graph 100 has been generated, next, the set E' of edges that are included in the minimum cut set, that is, the edges that the minimum cut line crosses, and the security plan X are initialized to empty sets (step S2). Step S2 is performed by the security plan information generation unit 203. The security plan X is a set of information that includes a security probability. For example, a group of an identification number of a target, information of a security line that is obtained according to the target, and a security probability constitutes an element. In the embodiment, information of a minimum cut set, that is, the edges that the minimum cut line crosses, is used as information of the security line.

Next, the security plan information generation unit 203 calculates the degree of risk of each target in the security graph 100 and obtains a set T' of the targets that have the greatest degree of risk (step S3). Step 3 is performed by the degree-of-risk calculation unit 203a. The degree of risk of a target is an expected value of the loss Ut in a case in which it is assumed that the intruder reaches the target and is calculated, for example, by the following Formula (1).

(Degree of risk)=(1−Σx)·Ut  (1)

Σx in Formula (1) is a sum of security probabilities x of routes from the set S of sources to the target. The security probability x is obtained by searching for an element of the security plan X using the identification number of the target as key information.

Note that in a case in which the security probability x that corresponds to the target does not exist in the security plan X, the calculation of Formula (1) is performed assuming Σx=0.

When the set T' has been obtained, the security plan information generation unit 203 then obtains the minimum cut that separates the set T' from the set S of sources, and adds to the set E' the minimum cut set (set of all the edges that the minimum cut line crosses) (step S4). Step S4 is cooperatively performed by the minimum-cut calculation unit 203b and the judgement unit 203c. The minimum-cut calculation unit 203b obtains the minimum cut using one of the known minimum-cut calculation methods in graph theory, such as a polynomial time algorithm. Note that in a case in which there exists a plurality of patterns of the minimum cut, the minimum-cut calculation unit 203b selects one pattern from among the plurality of patterns. The pattern may be selected by any method, and for example, the minimum cut that maximizes the number of vertices V which are included on the side of the set T' of the targets or the minimum cut that minimizes the number of vertices V which are included on the side of the set T' of the targets is selected.

In addition, in a case in which there exists a plurality of patterns of the minimum target for example, the plurality of patterns (minimum cut lines) may be displayed on the display device 4 via the display control unit 204 so that the operator may select one of them. In a case in which the pattern is selected by the operator, it is possible for the operator to select a most suitable minimum cut with reference to, for example, a situation of each location in the actual security area and advice from an expert.

In step S4, after the minimum cut is obtained, the judgement unit 203c adds the minimum cut set to the set E'. At that time, the judgement unit 203c adds the combination of edges to the set E' in a manner such that the added edges may be identified as a group of edges of one minimum cut set. For example, in a case in which the minimum cut set is $E_{i1,j1}$ and $E_{i2,j2}$, E' and $E_{i1,j1}$, $E_{i2,j2}$ are associated with each other assuming e1={$E_{i1,j1}$, $E_{i2,j2}$} and E'={e1}.

Note that only in a case in which there exist no elements of the set E' that match the minimum cut set to be added to the set E', the minimum cut set is added to the set E' as a new element.

Then, after step 4, the judgment unit 203c judges whether or not the elements of the set E' have increased in number (step S5), and selects a process that is performed next by the security plan information generation unit 203. In a case in which there is no increase in the number of elements of the set E' (No in step S5), as illustrated in FIG. 5B, the security graph 100 and the security plan X are displayed on the display device 4 via the display control unit 204 (step S8), and the process is terminated.

In contrast, in a case in which there is an increase in the number of elements of the set E' (Yes in step S5), the judgement unit 203c causes the security area graph generation unit 203d to perform a process (step S6) of generating a security area graph that is obtained by dividing the security graph into a plurality of areas by the elements of the set E'.

The security area graph generation unit 203d generates a security area graph that is obtained by dividing the security graph 100 (route graph G) into a plurality of areas by the elements of the set E'. In the security area graph, each divided area is set to a vertex and the element of the set E' is set to an edge. From among the vertices of the security area graph, the vertex that corresponds to the area which includes the target that has the greatest degree of risk is associated with the loss Ut that is incurred when the target is reached. In addition, an edge that is incident to two vertices in the security area graph is associated with the size of the minimum cut that separates the two vertices, that is, the number of edges that are included in the minimum cut set, as a weight.

When the security area graph has been generated, the security plan information generation unit 203 then solves using the security area graph the optimization problem with respect to the security probability and updates the security plan X to the optimum solution (step S7). Step S7 is performed by the security probability calculation unit 203e. The security probability calculation unit 203e solves the optimization problem with respect to a security probability $x_e$ of an edge e that is expressed, for example, by the following Formula (2), and calculates the optimum solution of the security probability $x_e$.

$$\begin{aligned}&\text{minimize} && \max_{\pi}\left(1-\sum_{e\in\pi}x_e\right)U_{\pi} \\ &\text{subject to} && 0\le x_e\le 1 \quad \forall\, e\in E' \\ &&& \sum_{e\in E'}C_e x_e = k\end{aligned} \quad (2)$$

E' in Formula (2) is a set of edges e in the security area graph. In addition, π and $U_\pi$ in Formula 2 are a route from an intrusion position to the target in the security area graph and the loss that is incurred when the intruder reaches the target, respectively. $C_e$ in Formula (2) is a weight of the edge e of the security area graph. k in Formula (2) is the number of security guards.

By solving Formula (2), all of the $C_e$ edges of the security graph 100 that correspond to the edge e of the security area graph are selected with the security probability $x_e$.

Note that Formula (2) is an example of a mathematical Formula for solving the optimization problem with respect to the security probability $x_e$. The mathematical formula for solving the optimization problem with respect to the security probability $x_e$ is not limited to Formula (2), and another known mathematical formula may be used. In addition, a mathematical formula that is obtained by changing part of a known mathematical formula may be used as the mathematical formula for solving the optimization problem with respect to the security probability $x_e$.

When the security plan X has been updated (step S7), the process returns to the process (step S3) of calculating the degree of risk of the target, and thereafter the processes in steps S3 to S7 are repeated until judgement in step S5 becomes "No".

Next, with reference to FIGS. 6 to 10, a security probability calculation method according to the embodiment will be specifically described.

Embodiment (First Example)

Figure 7A:
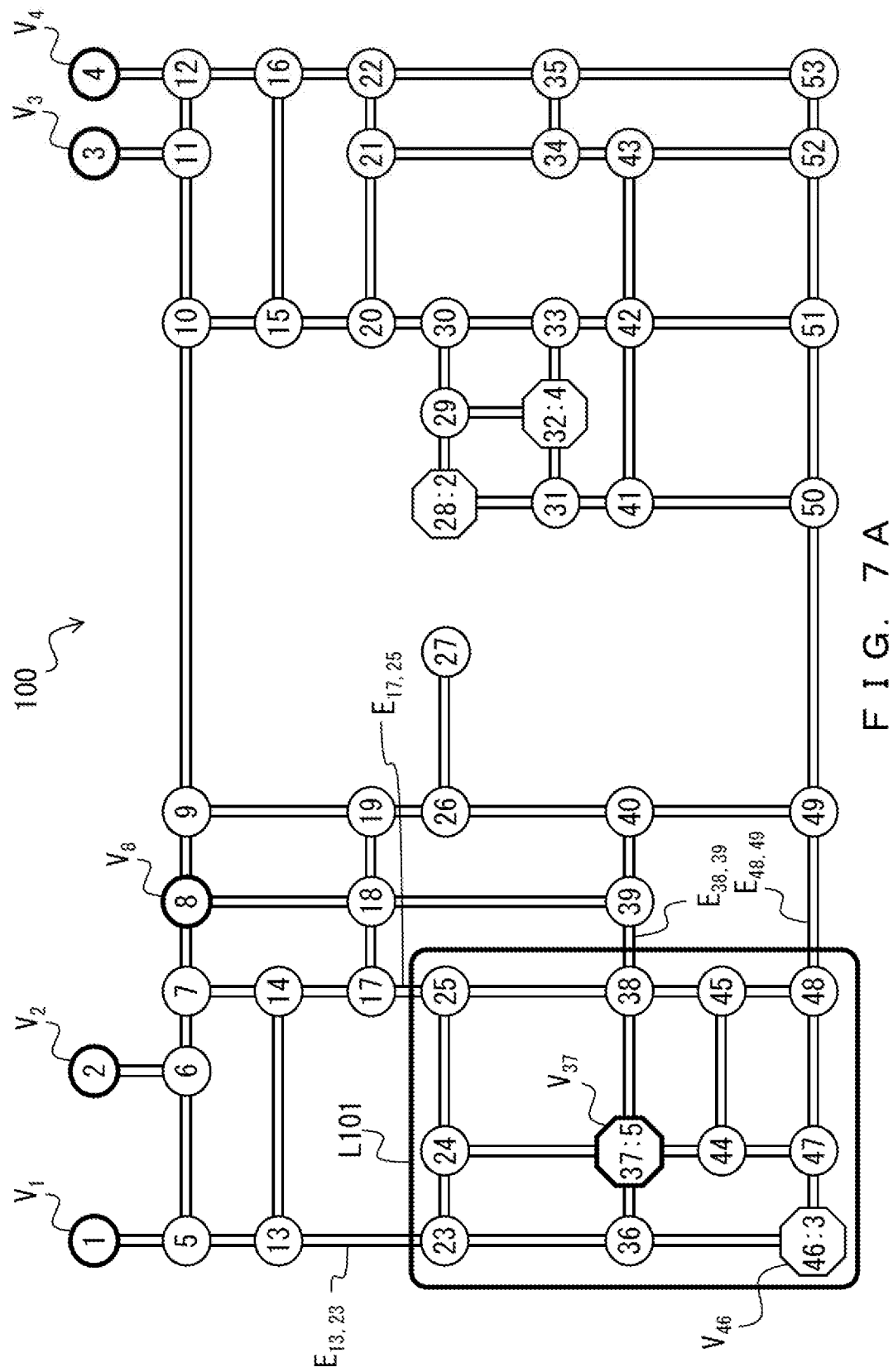
FIG. 7A is a schematic diagram illustrating the result of the process in the first performance of step S4 in the embodiment (first example).

FIG. 6 is a schematic diagram illustrating a calculation result of the degree of risk of each target in the embodiment (first example). FIG. 7A is a schematic diagram illustrating the result of the process in the first performance of step S4 in the embodiment (first example). FIG. 7B is a schematic diagram illustrating the result of the processes in the first performance of steps S6 and S7 in the embodiment (first example). Note that in FIG. 7B, only a portion of a closed curve L101 illustrated in FIG. 7A is illustrated in FIG. 7B.

In the embodiment (first example), interim progress and the final result of the process in step S4 will be described, the process being performed on condition that the minimum cut that maximizes the number of vertices V which are included on the side of the set T' of the target is selected in a case in which there exists a plurality of patterns of the minimum cut.

The targets in the security graph 100 in FIG. 1 are four vertices $V_{28}$, $V_{32}$, $V_{37}$, and $V_{45}$. Losses Ut in a case in which the respective targets are reached are 2 ($V_{28}$), 4 ($V_{32}$), 5 ($V_{37}$), and 3 ($V_{45}$), respectively.

At a time point when the process in step S3 is performed for the first time, the security plan X is an empty set and there exists no information of the security probability x.

Therefore, as illustrated in FIG. 6, the degrees of risk of the respective targets that are calculated in the process in the first performance of step S3 are 2.000 ($V_{28}$), 4.000 ($V_{32}$), 5.000 ($V_{37}$), and 3.000 ($V_{45}$), respectively. Thus, the set T' of the target that has the greatest degree of risk in the process in the first performance of step S3 is T'={$V_{37}$}.

Therefore, in the process in the next step S4, the minimum cut that separates the vertex $V_{37}$ from the set S of sources is calculated. The set S of sources is S={$V_1$, $V_2$, $V_3$, $V_4$, $V_8$} as illustrated in FIG. 1. Consequently, when the minimum cut is obtained using a known method, the minimum cut that is indicated by the closed curve L101 illustrated in FIG. 7A is selected as a solution thereof. The closed curve L101 is a minimum cut line that indicates the minimum cut that maximizes the area on the target side (vertex $V_{37}$ side) as described above.

In addition, in step S4, all the edges that the closed curve L101 crosses are added to the set E'. In the example illustrated in FIG. 7A, the closed curve L101 crosses four edges $E_{13,23}$, $E_{17,25}$, $E_{38,39}$, and $E_{48,49}$. Consequently, as a result of the process in the first performance of step S4, a group of the above four edges E, e1(={$E_{13,23}$, $E_{17,25}$, $E_{38,39}$, $E_{48,49}$}), is added to the set E'.

Therefore, judgment in the next step S5 is "Yes" and the processes in steps S6 and S7 are subsequently performed.

In the first performance of step S6, the security graph 100 is divided into two areas by the minimum cut (closed curve L101) that has been calculated in step S4, and as illustrated in FIG. 7B, a security area graph 150 is generated in which the divided two areas are set to vertices $V'_1$ and $V'_2$, respectively. At that time, the two vertices $V'_1$ and $V'_2$ are connected by an edge e1 that corresponds to the group of the four edges that the closed curve L101 crosses in the security graph 100.

In the security area graph 150 illustrated in FIG. 7B, one vertex $V'_1$ from among the two vertices includes the set S of sources and the other vertex $V'_2$ includes the target ($V_{37}$) that has the greatest degree of risk. Therefore, the loss $U_\pi$ in a case in which the intruder who intruded from the vertex $V'_1$ has reached the vertex $V'_2$ is 5. In addition, the edge e1 corresponds to the edges that the closed curve L101 crosses in the security graph 100, that is, the minimum cut set of the minimum cut that is indicated by the closed curve L101. Therefore, a weight $C_{e1}$ of the edge e1 is 4.

If the number of security guards k=3 is added to the above described conditions and the optimization problem expressed by the above Formula (2) is solved in step S7, a security probability $x_{e1}$ is 3/4 as illustrated in FIG. 7B.

Therefore, in the first performance of the process in S7, the security probability $x_{e1}$ is associated with information of the closed curve L101 and information of all the targets that are included on the side of the target which has the greatest degree of risk when the security graph 100 is divided by the closed curve L101, and the security plan X is updated. As the information of the closed curve L101, for example, information of the edges that the closed curve L101 crosses, e1={$E_{13,23}$, $E_{17,25}$, $E_{38,39}$, $E_{48,49}$} is used. In addition, as illustrated in FIG. 7A, the targets that are included on the side of the target which has the greatest degree of risk in the first performance of the process are the two vertices $V_{37}$ and $V_{46}$. Therefore, the security plan X is updated to information that is expressed by the following Formulas (3-1) to (3-3).

$$X=\{X1\} \quad (3\text{-}1)$$

$$X1=\{3/4, e1, V_{37}, V_{46}\} \quad (3\text{-}2)$$

$$e1=\{E_{13,23}, E_{17,25}, E_{38,39}, E_{48,49}\} \quad (3\text{-}3)$$

As described, when the processes in the first performance of steps S3 to S7 are terminated, the process returns to step S3 and a second performance of the process is initiated.

Figure 8A:
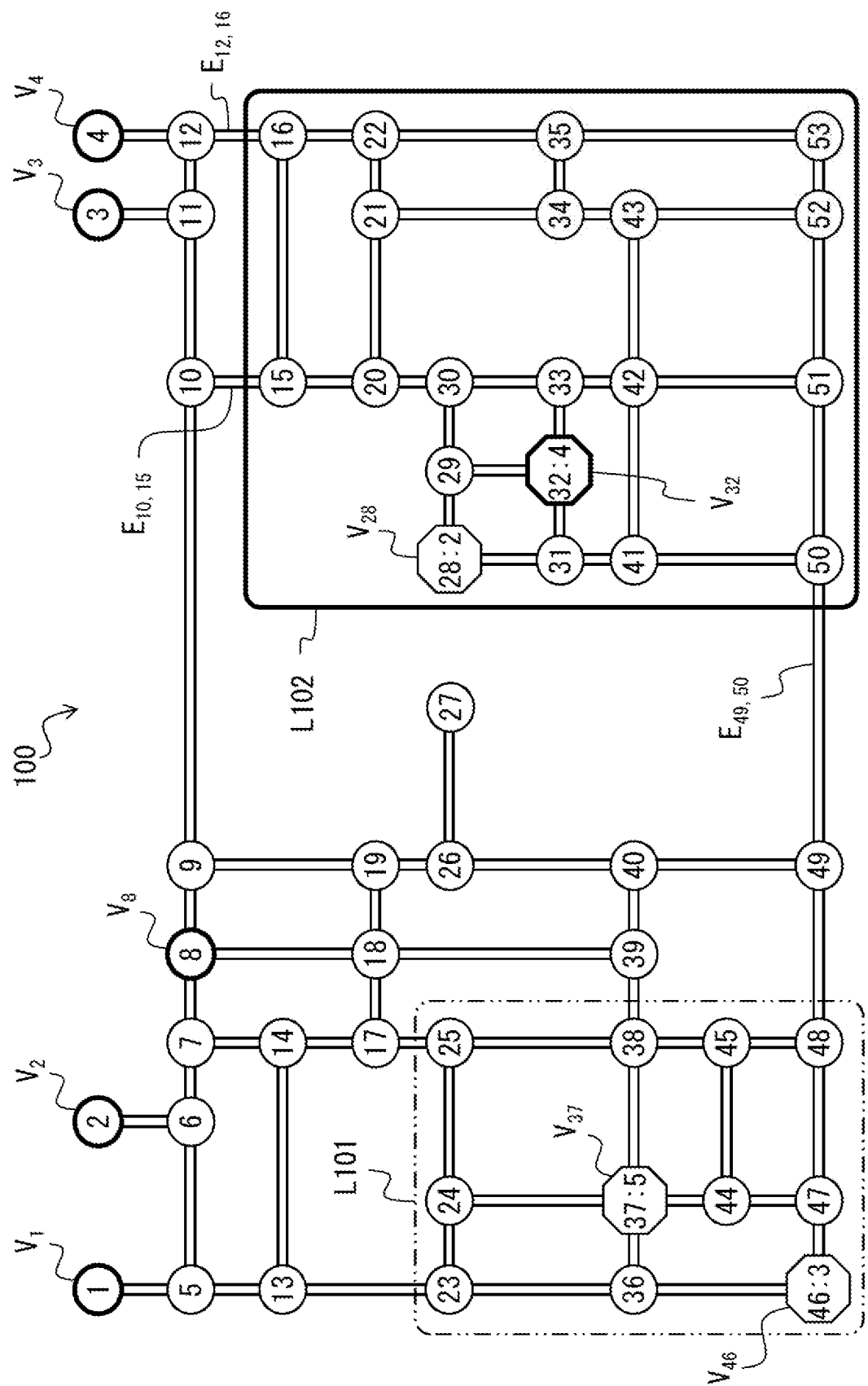
FIG. 8A is a schematic diagram illustrating the result of the process in the second performance of step S4 in the embodiment (first example).
Figure 8B:
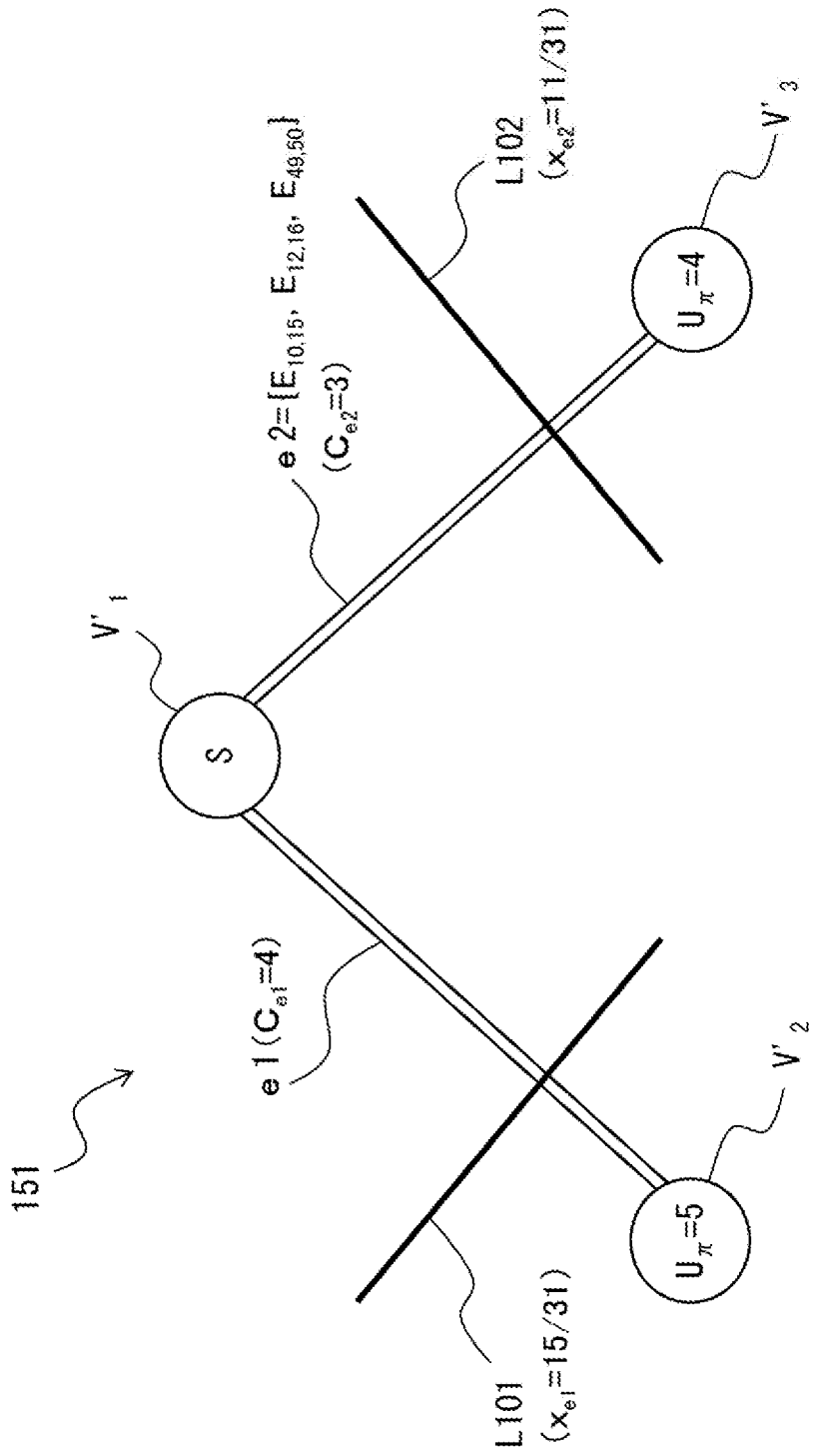
FIG. 8B is a schematic diagram illustrating the result of the processes in the second performance of steps S6 and S7 in the embodiment (first example).

FIG. 8A is a schematic diagram illustrating the result of the second performance of the process in step S4 in the embodiment (first example). FIG. 8B is a schematic diagram illustrating the result of the processes in the second performance of steps S6 and S7 in the embodiment (first example). Note that in FIG. 8B, only a portion of the closed curves L101 and L102 illustrated in FIG. 8A are illustrated.

At a time point when the process in step S3 is performed for the second time, the security probability $x_{e1}$ (=3/4) that is associated with the vertices $V_{37}$ and $V_{46}$ from among the four targets is stored in the security plan X. Therefore, when the degrees of risk of the vertices $V_{37}$ and $V_{46}$ are calculated in the second performance of the process in step S3, 3/4 is input to the security probability $\Sigma x$ in Formula (1). In contrast, when the degrees of risk of the vertices $V_{28}$ and $V_{32}$ are calculated in the second performance of step S3, 0 is input to the security probability $\Sigma x$ in Formula (1). Therefore, as illustrated in FIG. 6, the degrees of risk of the respective targets that are calculated in the second performance of the process in step S3 are 2.000 ($V_{28}$) 4.000 ($V_{32}$) 1.250 ($V_{37}$) and 0.750 ($V_{46}$) respectively. Thus, the set T' of the target that has the greatest degree of risk in the second performance of the process in step S3 is T'={$V_{32}$}.

Therefore, in the second performance of the process in step S4, the minimum cut that separates the vertex $V_{32}$ from the set S of sources is calculated. Here, the minimum cut that is indicated by the closed curve L102 illustrated in FIG. 8A and that cuts three edges $E_{10,15}$, $E_{12,16}$, and $E_{49,50}$ is selected.

In addition, in step S4, a group of the three edges that the closed curve L102 which indicates the selected minimum cut crosses, e2(={$E_{10,15}$, $E_{12,16}$, $E_{49,50}$}) is added to the set E'. That is, the set E' is updated to information expressed by the following Formulas (4-1) to (4-3).

$$E'=\{e1,e2\} \quad (4\text{-}1)$$

$$e1=\{E_{13,23},E_{17,25},E_{38,39},E_{48,49}\} \quad (4\text{-}2)$$

$$e2=\{E_{10,15},E_{12,16},E_{49,50}\} \quad (4\text{-}3)$$

Therefore, the judgment in the next step S5 is "Yes" and the processes in steps S6 and S7 are subsequently performed.

When the process in step S6 is performed for the second time, as described above, the set E' includes two elements, that is, e1 that represents the group of edges that the closed curve L101 crosses and e2 that represents the group of edges that the closed curve L102 crosses. Therefore, in the second performance of the process in step S6, the security graph 100 is divided into three areas by the minimum cuts that are indicated by the closed curves L101 and L102, and a security area graph 151 is generated in which the divided three areas are set to vertices V'$_1$, V'$_2$, and V'$_3$, respectively, as illustrated in FIG. 8B.

In the security area graph 151, from among the three vertices, the vertex V'$_1$ that two edges e1 and e2 are incident to includes the set S of sources.

From among the remaining two vertices, the vertex V'$_2$ that the edge e1 is incident to indicates an area that is separated from the set S of sources by the closed curve (minimum cut line) L101. That is, the vertex V'$_2$ includes two (vertices $V_{37}$ and $V_{45}$) from among the four targets in the security graph 100. The loss Ut of the vertex $V_{37}$ is greater than the loss of the vertex $V_{45}$. Therefore, the loss $U_\pi$ in a case in which the intruder who intruded from the vertex V'$_1$ has reached the vertex V'$_2$ is the loss of the vertex $V_{37}$, that is, 5. In addition, the edge e1 indicates the edges that the closed curve L101 crosses in the security graph 100 as described above. Therefore, the weight $C_{e1}$ of the edge e1 is 4.

The vertex V'$_3$ that the edges e2 are incident to indicates an area that is separated from the set S of sources by the closed curve (minimum cut line) L102. That is, the vertex V'$_3$ includes two (vertices $V_{28}$ and $V_{32}$) from among the four targets in the security graph 100. The loss of Ut of the vertex $V_{32}$ is greater than the loss of the vertex $V_{28}$. Therefore, the loss $U_\pi$ in a case in which the intruder who intruded from the vertex V'$_1$ has reached the vertex V'$_3$ is the loss of the vertex $V_{32}$, that is, 4. In addition, the edge e2 represents the edges that the closed curve L102 crosses in the security graph 100 as described above. Therefore, a weight $C_{e2}$ of the edge e2 is 3.

If the number of security guards k=3 is added to the above described conditions and the optimization problem expressed by the above Formula (2) is solved in step S7, the security probability $x_{e1}$ of the edge e1 is 15/31 as illustrated in FIG. 8B. In addition, a security probability $x_{e2}$ of the edge e2 is 11/31.

Therefore, in the second performance of the process in step S7, the security plan X is updated to information that is expressed by the following Formulas (5-1) to (5-5).

$$X=\{X1,X2\} \quad (5\text{-}1)$$

$$X1=\{15/31,e1,V_{37},V_{46}\} \quad (5\text{-}2)$$

$$e1=\{E_{13,23},E_{17,25},E_{38,39},E_{48,49}\} \quad (5\text{-}3)$$

$$X2=\{11/31,e2,V_{28},V_{32}\} \quad (5\text{-}4)$$

$$e2=\{E_{10,15},E_{12,26},E_{49,50}\} \quad (5\text{-}5)$$

As described, when the second performance of the processes in steps S3 to S7 are terminated, the process returns to step S3 and the performance of the process for a third time is initiated.

Figure 9A:
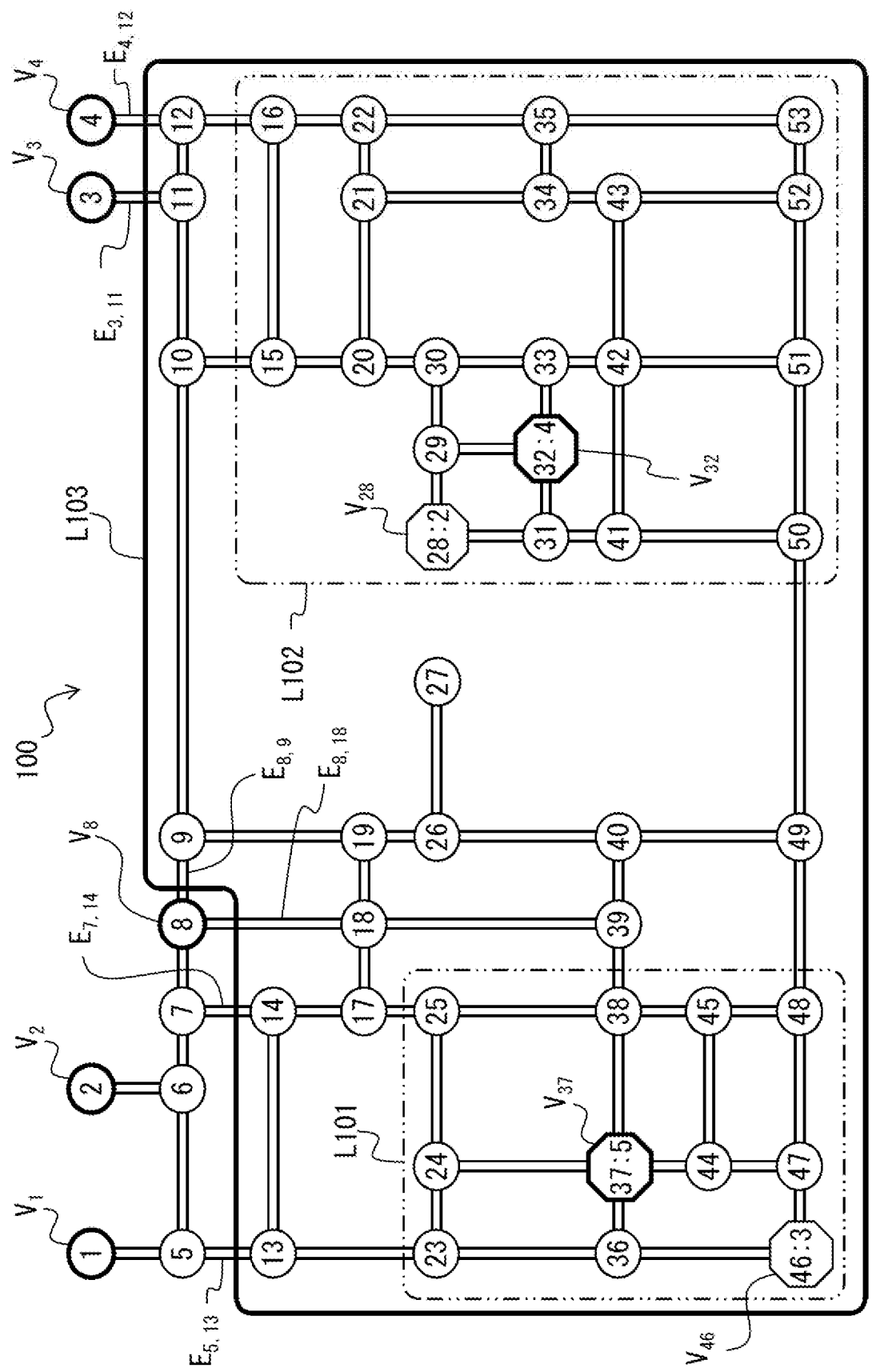
FIG. 9A is a schematic diagram illustrating the result of the process in the third performance of step S4 in the embodiment (first example).
Figure 9B:
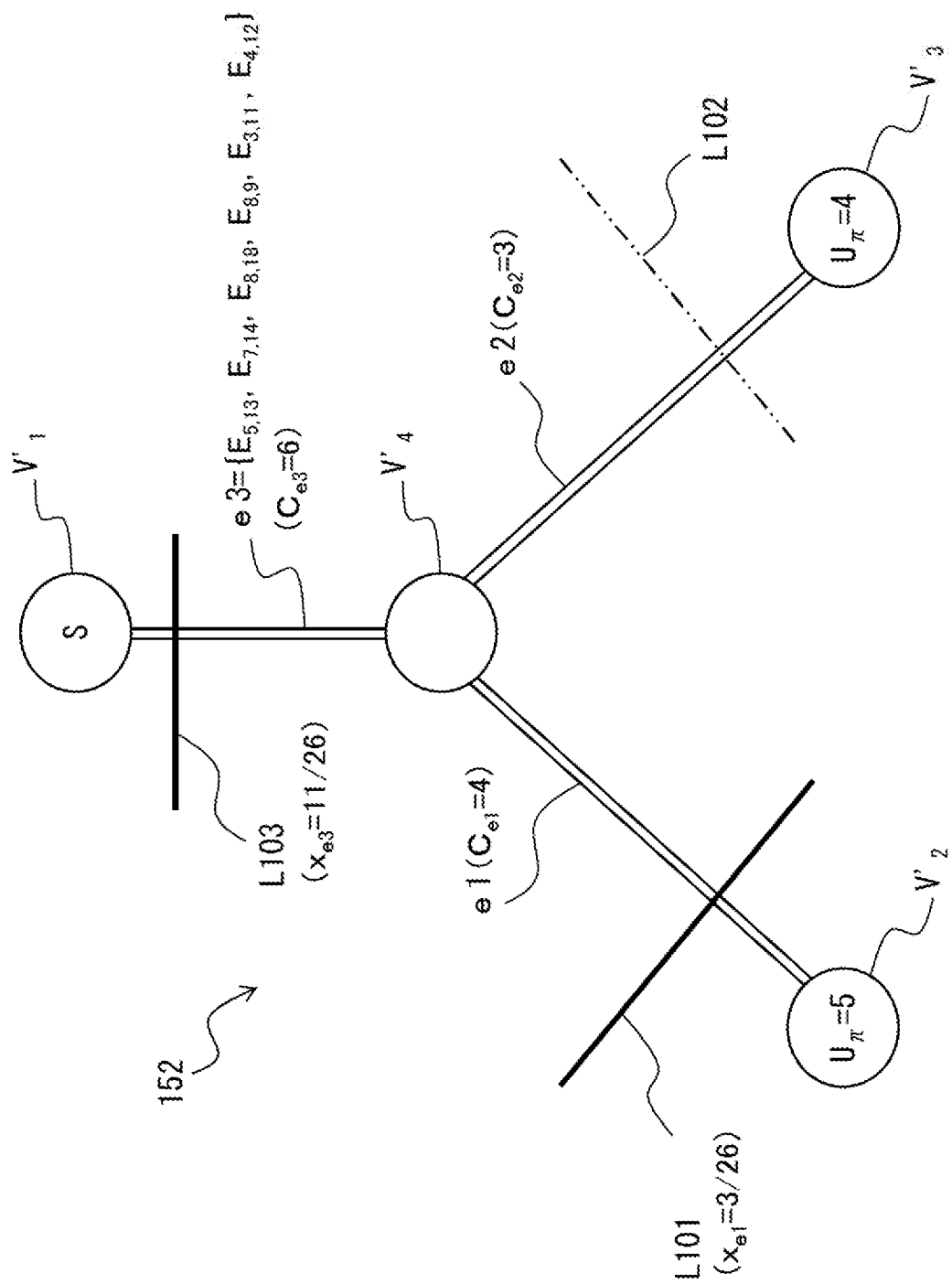
FIG. 9B is a schematic diagram illustrating the result of the processes in the third performance of steps S6 and S7 in the embodiment (first example).

FIG. 9A is a schematic diagram illustrating the result of the third performance of the process in step S4 in the embodiment (first example). FIG. 9B is a schematic diagram illustrating the result of the third performance of the processes in steps S6 and S7 in the embodiment (first example). Note that in FIG. 9B, only a portion of the closed curves L101, L102, and L103 illustrated in FIG. 9A is illustrated.

At a time point when the process in step S3 is performed for the third time, the security probability $x_{e1}$ (=15/31) that is associated with the vertices $V_{37}$ and $V_{46}$ and the security probability $x_{e2}$ (=11/31) that is associated with the vertices $V_{28}$ and $V_{32}$ are stored in the security plan X. Therefore, as illustrated in FIG. 6, the degrees of risk of the respective targets that are calculated in the third performance of the process in S3 are 1.290 ($V_{28}$), 2.581 ($V_{32}$), 2.581 ($V_{37}$), and 1.548 ($V_{45}$), respectively. Thus, the set T' of the targets that have the greatest degree of risk in the performance of the process in step S3 is T'={$V_{32}$, $V_{37}$}.

Therefore, in the process performed for the third time in step S4, the minimum cut that separates the two vertices $V_{32}$ and $V_{37}$ from the set S of sources is calculated. Here, the minimum cut that is indicated by the closed curve L103 illustrated in FIG. 8A and that cuts six edges $E_{5,13}$, $E_{7,14}$, $E_{8,18}$, $E_{8,9}$, $E_{3,11}$, and $E_{4,12}$ is selected.

In addition, in step S4, a group of the six edges that the closed curve L102 which indicates the selected minimum cut crosses, e3(={$E_{5,13}$, $E_{7,14}$, $E_{8,18}$, $E_{8,9}$, $E_{3,11}$, $E_{4,12}$}), is added to the set E'. That is, the set E' is updated to information expressed by the following Formulas (6-1) to (6-4).

$E'=\{e1,e2,e3\}$ (6-1)

$e1=\{E_{13,23}, E_{17,25}, E_{38,39}, E_{48,49}\}$ (6-2)

$e2=\{E_{10,15}, E_{12,16}, E_{49,50}\}$ (6-3)

$e3=\{E_{5,13}, E_{7,14}, E_{8,18}, E_{8,9}, E_{3,11}, E_{4,12}\}$ (6-4)

Therefore, judgment in the next step S5 is "Yes" and the processes in steps S6 and S7 are subsequently performed.

When the process in step S6 is performed for the third time, as described above, the set E' includes three elements, that is, e1 that represents the group of edges that the closed curve L101 crosses, e2 that represents the group of edges that the closed curve L102 crosses, and e3 that represents the group of edges that the closed curve L103 crosses. Therefore, in the third performance of the process in step S6, the security graph 100 is divided into four areas by the closed curves L101, L102 and L103, and a security area graph 152 is generated in which the divided four areas are set to vertices V'$_1$, V'$_2$, V'$_3$ and V'$_4$, respectively, as illustrated in FIG. 9B.

In the security area graph 152, from among the four vertices, the vertex V'$_4$ that the three edges e1, e2, and e3 are incident to represents an area that is separated from the set S of sources, the area that includes the vertices V$_{37}$ and V$_{46}$, and the area that includes the vertices V$_{28}$ and V$_{32}$. As illustrated in FIG. 9A, there exist no targets in the area that corresponds to the vertex V'$_4$ in the security graph 100. Therefore, the loss U$_\pi$ is not set to the vertex V'$_4$.

The vertex V'$_1$ that is connected to the vertex V'$_4$ by the edge e3 represents the set S of sources. Therefore, the loss U$_\pi$ is not set to the vertex V'$_1$.

The vertex V'$_2$ that is connected to the vertex V'$_4$ by the edge e1 represents an area that is separated from the set S of sources by the closed curve L101 and includes two (vertices V$_{37}$ and V$_{46}$) from among the four targets in the security graph 100. Therefore, similarly to the second performance of the process, the loss U$_\pi$ in a case in which the intruder who intruded from the vertex V'$_1$ has reached the vertex V'$_2$ is 5. In addition, since the edge e1 represents the edges that the closed curve L101 crosses in the security graph 100, the weight C$_{e1}$ of the edge e1 is 4.

The vertex V'$_3$ that is connected to the vertex V'$_4$ by the edge e2 represents an area that is separated from the set S of sources by the closed curve L102 and includes two (vertices V$_{28}$ and V$_{32}$) from among the four targets in the security graph 100. Therefore, similarly to the second performance of the process, the loss U$_\pi$ in a case in which the intruder who intruded from the vertex V'$_1$ has reached the vertex V'$_3$ is 4. In addition, since the edge e2 represents the edges that the closed curve L101 crosses in the security graph 100, the weight C$_{e2}$ of the edge e2 is 3.

If the number of security guards k=3 is added to the above described conditions and the optimization problem expressed by the above Formula (2) is solved, the security probability x$_{e1}$ of the edge e1 is 3/26 and the security probability x$_{e3}$ of the edge e3 is 11/26 as illustrated in FIG. 9B.

Therefore, in the third performance of the process in S7, the security plan X is updated to information that is expressed by for example, the following Formulas (7-1) to (7-5).

$X=\{X1,X3\}$ (7-1)

$X1=\{3/26, e1, V_{37}, V_{46}\}$ (7-2)

$e1=\{E_{13,23}, E_{17,25}, E_{38,39}, E_{48,49}\}$ (7-3)

$X3=\{11/26, e3, V_{28}, V_{32}, V_{37}, V_{46}\}$ (7-4)

$e3=\{E_{5,13}, E_{7,14}, E_{8,18}, E_{8,9}, E_{3,11}, E_{4,12}\}$ (7-5)

As described, when the third performance of the processes in steps S3 to S7 are terminated, the process returns to step S3 and the fourth performance of the process is initiated.

At a time point when the process in step S3 is performed for the fourth time, the security probability x$_{e1}$ (=3/26) that is associated with the vertices V$_{37}$ and V$_{46}$ and the security probability x$_{e3}$ (=11/26) that is associated with the vertices V$_{28}$, V$_{32}$, V$_{37}$, and V$_{46}$ are stored in the security plan X. Therefore, as illustrated in FIG. 6, the degrees of risk of the respective targets that are calculated in the fourth performance of the process in step S3 are 1.154 (V$_{28}$), 2.308 (V$_{32}$), 2.308 (V$_{37}$), and 1.385 (V$_{46}$), respectively. Thus, the set T' of the targets that have the greatest degree of risk in the fourth performance of the process in step S3 is T'={V$_{32}$, V$_{37}$}.

Therefore, in the fourth performance of the process in step S4, in the same manner as in the third performance of the process, the minimum cut that separates the two vertices V$_{32}$ and V$_{37}$ from the set S of sources is calculated. Therefore, the minimum cut that is indicated by the closed curve L103 illustrated in FIG. 9A and that cuts the six edges E$_{5,13}$, E$_{7,14}$, E$_{8,18}$, E$_{8,9}$, E$_{3,11}$, and E$_{4,12}$ is selected.

The group of edges that the closed curve L103 crosses has been added to the set E' in the third performance of the process in step S4. Therefore, there exist no elements (group of edges) that are newly added to the set E' in the fourth performance of the process in step S4. Thus, the judgement in step S5 is "No", and then the process in step S8 is performed.

Figure 10:
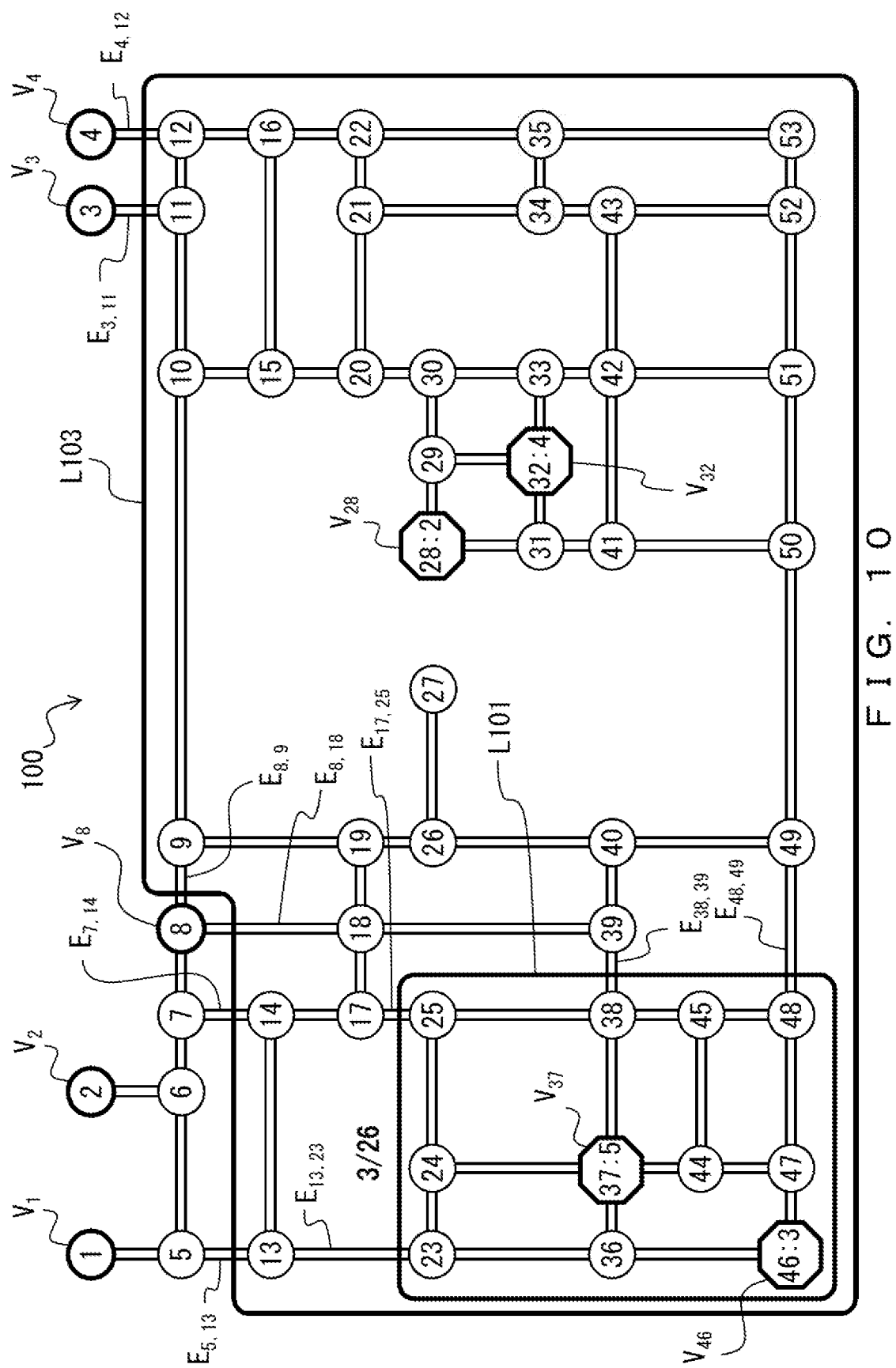
FIG. 10 is a schematic diagram illustrating a display example of the security plan information according to the embodiment (first example).

FIG. 10 is a schematic diagram illustrating a display example of the security plan information according to the embodiment (first example).

In step S8, as described above, information of the security plan X (security plan information) is added to the security graph 100 and is displayed on the display device 4.

Information of the security plan X at the time point of performing the process in step S8 is the information that is updated in the third performance of the process in step S7 and that is expressed by the above Formulas (7-1) to (7-5). From among these formulas, Formula (7-3) expresses the group of edges that the closed curve L101 which has been calculated in the first performance of step S4 crosses. In addition, Formula (7-5) expresses the group of edges that the closed curve L103 which has been calculated in the third performance of step S4 crosses.

Therefore, in step S8, as illustrated in FIG. 10, an image that is obtained by overlapping the closed curves L101 and L103 which serve as security lines on the security graph 100 is displayed on the display device 4. At that time, the security probability x$_{e1}$ (=3/26) with respect to the edge e1 that the closed curve L101 crosses is displayed in the vicinity of the closed curve L101. Similarly, the security probability x$_{e3}$ (=11/26) with respect to the edge e3 that the closed curve L103 crosses is displayed in the vicinity of the closed curve L103.

As can be seen from FIG. 10, the security line (closed curve L101, L103) crosses the routes (edges) that allow the intruder to head for a target (security target) in an area that is surrounded by the security line from outside the area. For example, in a case in which the intruder heads for the vertex V$_{37}$, he or she has to pass through one of the edges E$_{13,23}$, E$_{17,25}$, E$_{38,39}$, and E$_{48,49}$ that the closed curve L101 which indicates the minimum cut that separates the vertex V$_{37}$ from the set S of sources crosses. In addition, the security line is obtained according the minimum cut that separates a specified target from the set S of sources. Therefore, by looking at the security lines in the security plan information illustrated in FIG. 10, it can be easily understood that the security lines indicate an efficient deployment of the security guards with respect to, for example, the vertices $V_{37}$ and $V_{46}$.

In addition, when the optimization problem expressed by Formula (2) is solved and the security lines are specified, $C_e$ edges of the security model 100 that one security line crosses are selected with the same security probability $X_e$. Therefore, by displaying security probabilities (for example, 3/26 and 11/26) near the security lines, efficient deployment of the three security guards with respect to the security graph 100 illustrated in FIG. 10 is easily grasped. In the example illustrated in FIG. 10, it is easily understood that security may be provided by changing deployment locations of the three security guards so that the frequency of deploying the security guards on the edges that the closed curve L101 crosses is 3/26 and the frequency of deploying the security guards on the edges that the closed curve L103 crosses is 11/26.

Therefore, according to the embodiment (first example), the deployment locations of the security guards and the reason why it is preferable to deploy the security guards at the deployment locations can be easily understood, and the appropriateness of the security plan is more easily evaluated.

Furthermore, since the security probability is obtained according to the rule that the degree of risk of the target that has the greatest degree of risk be reduced, it is possible to easily explain the rule in the case of asking a third party such as an expert for an appropriateness evaluation. In addition, since the rule itself is simple, it is easy for the third party such as an expert to evaluate the appropriateness of the security plan.

Furthermore, minimum cuts that separate the target that has the greatest degree of risk from the set of sources are accumulated, and in a case in which a newly calculated minimum cut has already been accumulated, the calculation process of the security probability is terminated at that time point. In a case in which a calculation of the security probability based on the newly calculated minimum cut is performed according to the minimum cut that is the same as the previous minimum cut, the calculated security probability is the same as that in the last time, and the security probability will not change even if the processes in steps S3 to S7 are further repeated. Thus, in a case in which the newly calculated minimum cut has already been accumulated, by terminating the calculation of the security probability, it is possible to suppress an increase in the processing load of the security plan support device due to an increase in the calculation amount. In addition, since the security probability is obtained according to the rule that the degree of risk of the target that has the greatest degree of risk be reduced, points that are important in terms of security will not be overlooked.

Figure 11:
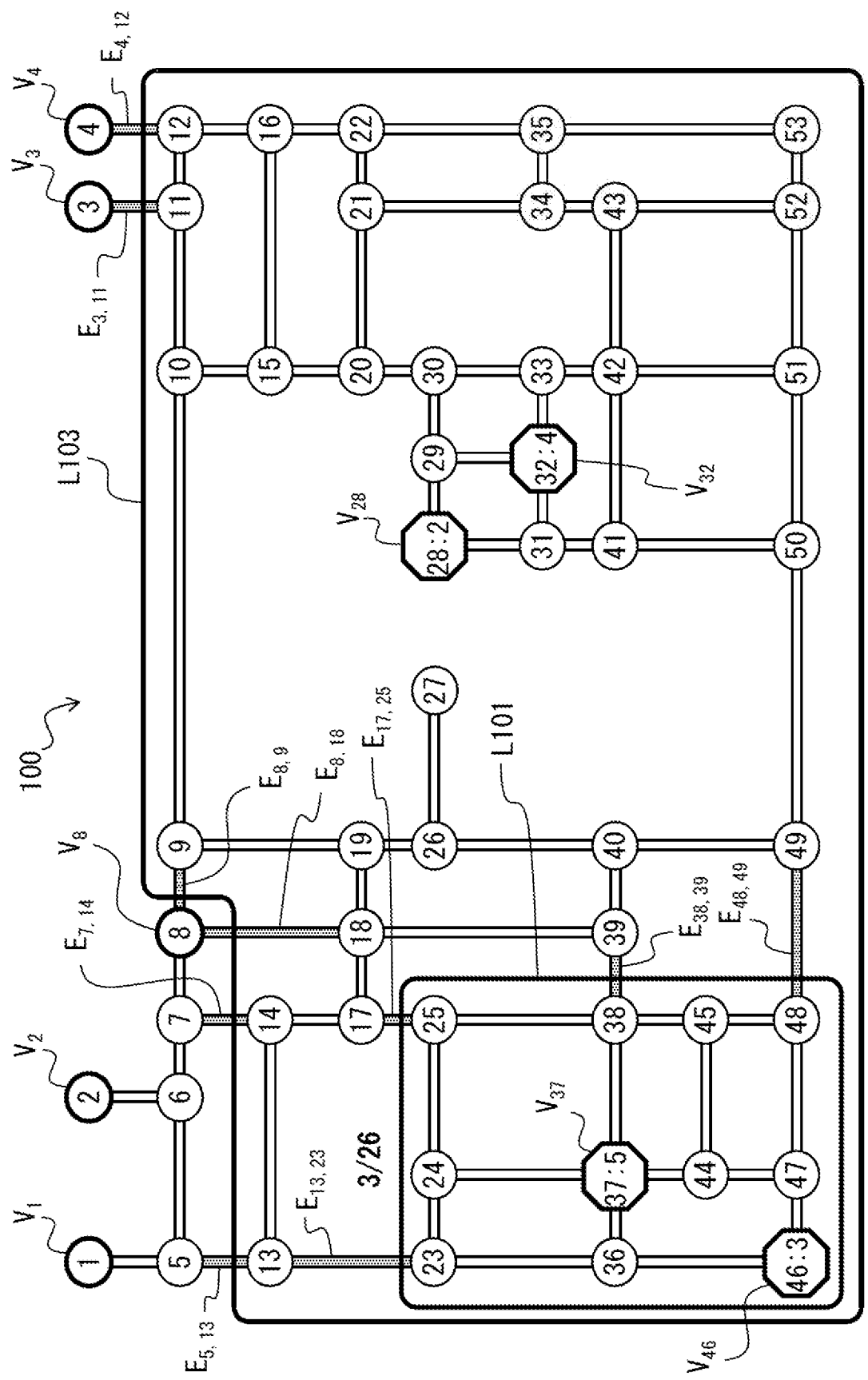
FIG. 11 is a schematic diagram illustrating another display example of the security plan information according to the embodiment (first example).

FIG. 11 is a schematic diagram illustrating another display example of the security plan information according to the embodiment (first example).

In the display example of the security plan information illustrated in FIG. 10, the security probabilities and the security lines (closed curves L101 and L103) that are included in the security plan X are displayed so as to overlap the security graph 100.

However, the way of displaying the security plan information on the display device 4 is not limited to this. As illustrated in FIG. 11, the edges that the closed curves L101 and L103 cross in the security graph 100 may be highlighted, for example, by changing their color. As described, by highlighting the edges that the closed curves L101 and L103 cross, the meaning of the closed curves L101 and L103 (that is, the edges to which the security guards are deployed) becomes clearer.

[Hardware Configuration]

Figure 12:
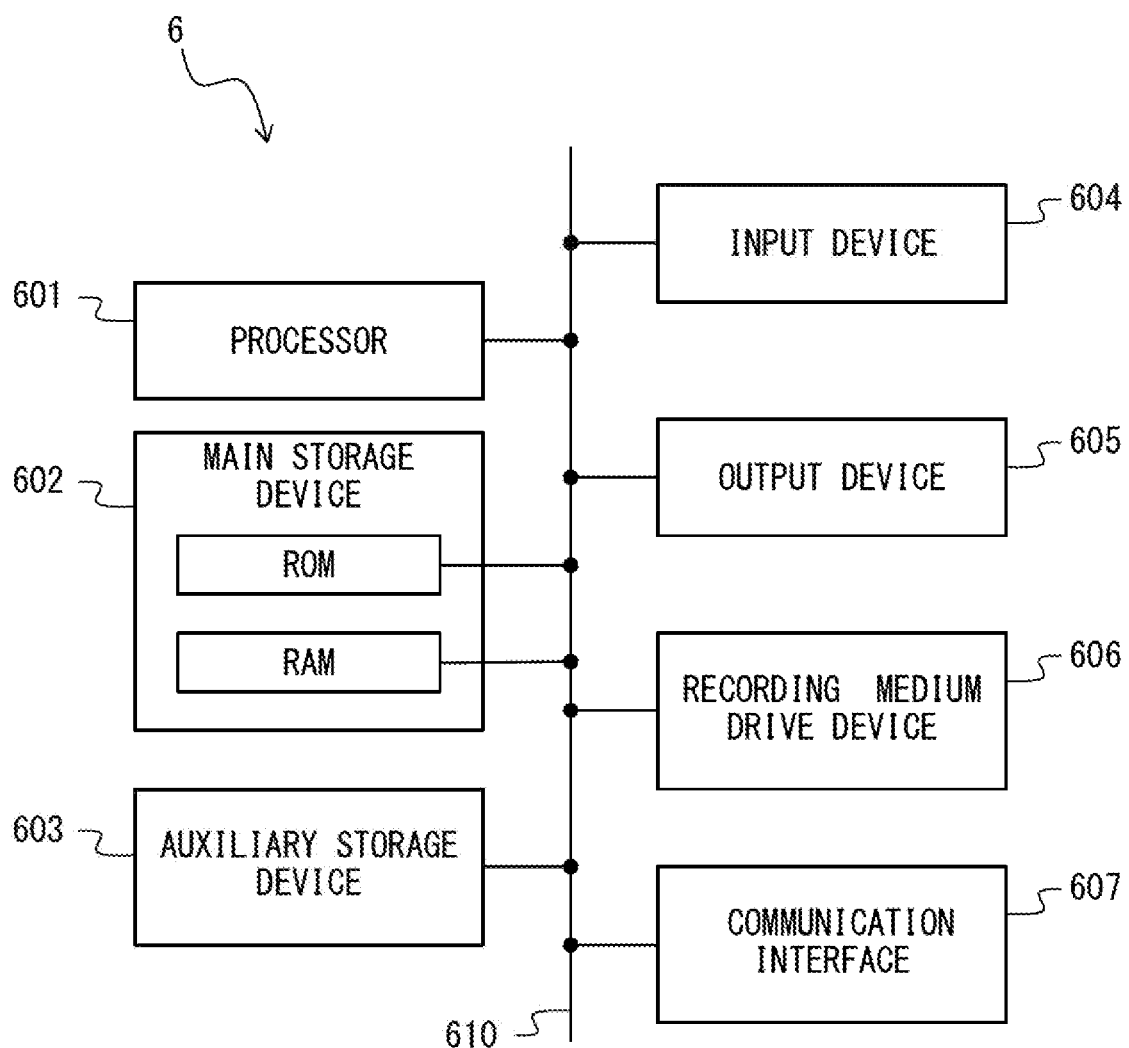
FIG. 12 is a schematic diagram illustrating a hardware configuration of the security plan support device.

FIG. 12 is a schematic diagram illustrating a hardware configuration of the security plan support device.

Figure 5B:
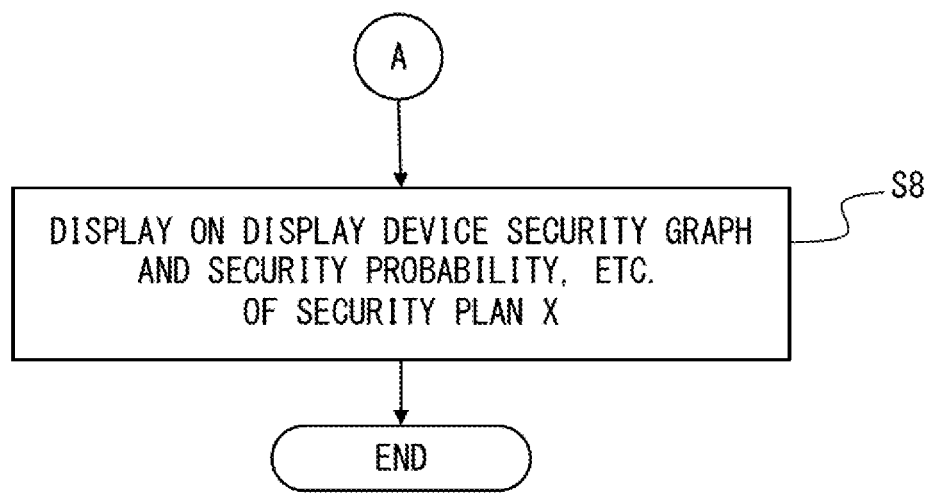
FIG. 5B is a flowchart (part 2) illustrating the security plan support method according to the embodiment of the present invention.

The above security plan support device 2 according to the embodiment is realized, for example, by a computer and a program that causes the computer to execute the processes illustrated in FIGS. 5A and 5B.

As illustrated in FIG. 12, a computer 6 includes a processor 601, a main storage device 602, an auxiliary storage device 603, an input device 604, a display device 605, a storage medium drive device 606, and a communication interface 607. The elements 601 to 607 are interconnected via a bus 610, and data may be transferred between the elements.

The processor 601 is an arithmetic processing device such as a central processing unit (CPU) that controls the entire operation of the computer 6 by executing various programs.

The main storage device 602 includes a read only memory (ROM) 602a and a random access memory (RAM) 602b. In the ROM 602a, for example, a specified basic control program that is read by the processor 601 at start-up of the computer 6 is recorded in advance. The RAM 602b is used as a working storage area as appropriate when the processor 601 executes various programs. In the embodiment, the RAM 602b is used for temporarily storing, for example, the set E' of edges and the security plan X during the above processes.

The auxiliary storage device 603 is a storage device such as a hard disk drive (HDD) and a solid state disk (SSD) that has a higher capacity than the main storage device 602. The auxiliary storage device 603 stores various programs (for example, the program that corresponds to the above processes) that are executed by the processor 601 and various data (for example, route information). The processor 601 reads and executes the program that is stored in the auxiliary storage device 603 and reads as appropriate the various data that are stored in the auxiliary storage device 603.

The input device 604 is, for example, a keyboard device or a mouse device. When operated by an operator of the computer 6, the input device 604 transmits to the processor 601 input information that is associated with the operation content.

The display device 605 is, for example, a liquid crystal display and displays various texts, images, etc. according to display data that is transmitted from the processor 601.

The storage medium drive device 606 reads a program and data that are recorded in a portable recording medium, not illustrated, and records data, etc. that is stored in the auxiliary storage device 603 in the portable recording medium. As the portable recording medium, for example, a flash memory that is equipped with a USB connector may be used. In addition, as the portable recording medium, an optical disk such as a compact disk (CD), a digital versatile disc (DVD), and a Blu-ray disc (Blu-ray is a registered trademark) may be used.

The communication interface 607 interconnects the computer 6 and a communication network 5 such as the Internet so that they can communicate with each other and communicates with an external communication device, etc. via the communication network.

In the computer 6, the processor 601, the main storage device 602, the auxiliary storage device 603, etc. cooperatively calculate the minimum cut and the security probability according to a specified program, and the calculation result is displayed on the display device 605.

As long as the computer 6 includes the communication interface 607, for example, route information and a security graph that are generated by another computer may be transmitted to the computer 6 and the computer 6 may calculate the security probability, etc. In addition, security plan information such as the calculated security probability may be returned to the other computer and the other computer may display the security plan information so that the appropriateness of the security plan may be evaluated.

Reference Example

Figure 13A:
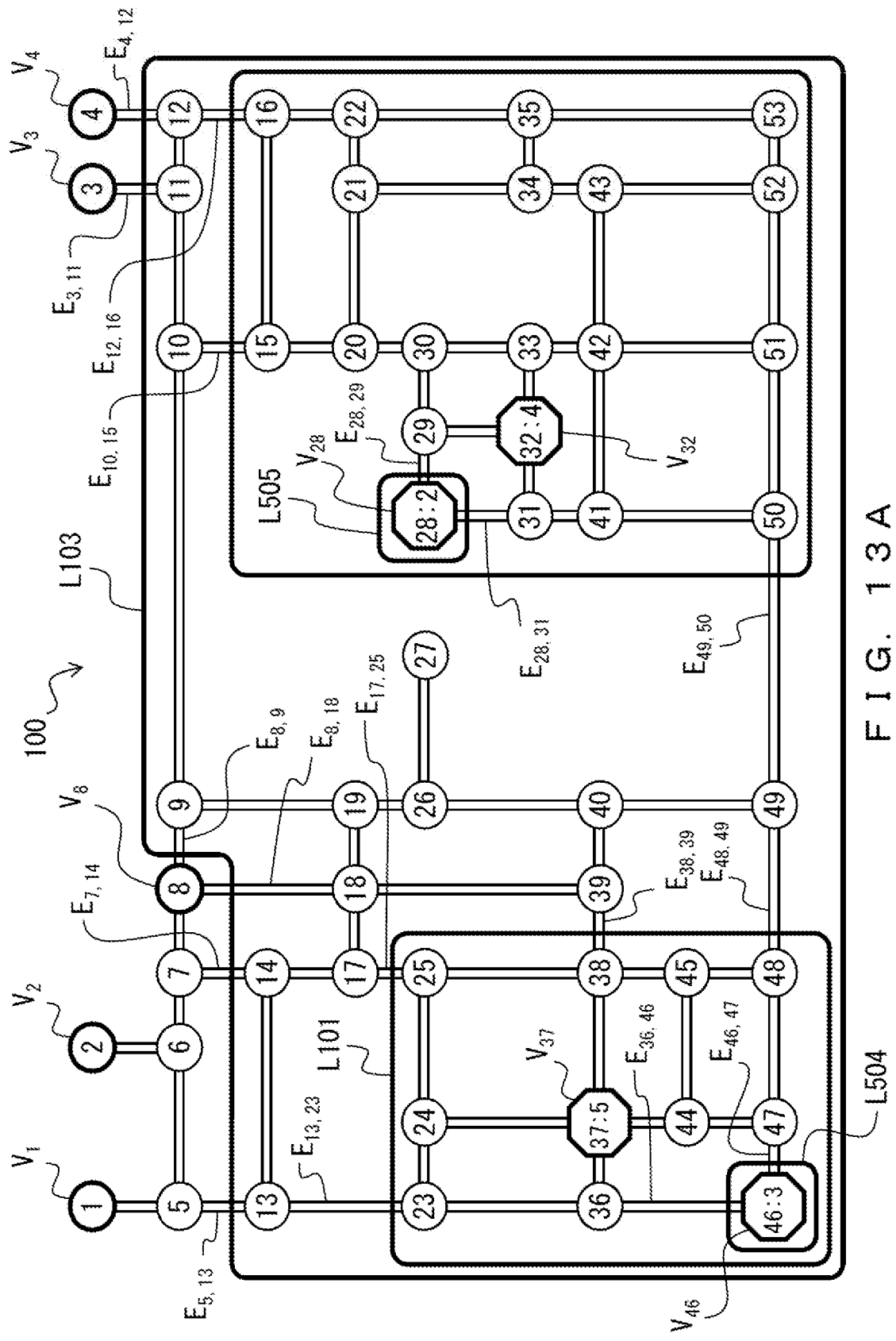
FIG. 13A is a schematic diagram illustrating a reference example to be compared with the embodiments.
Figure 13B:
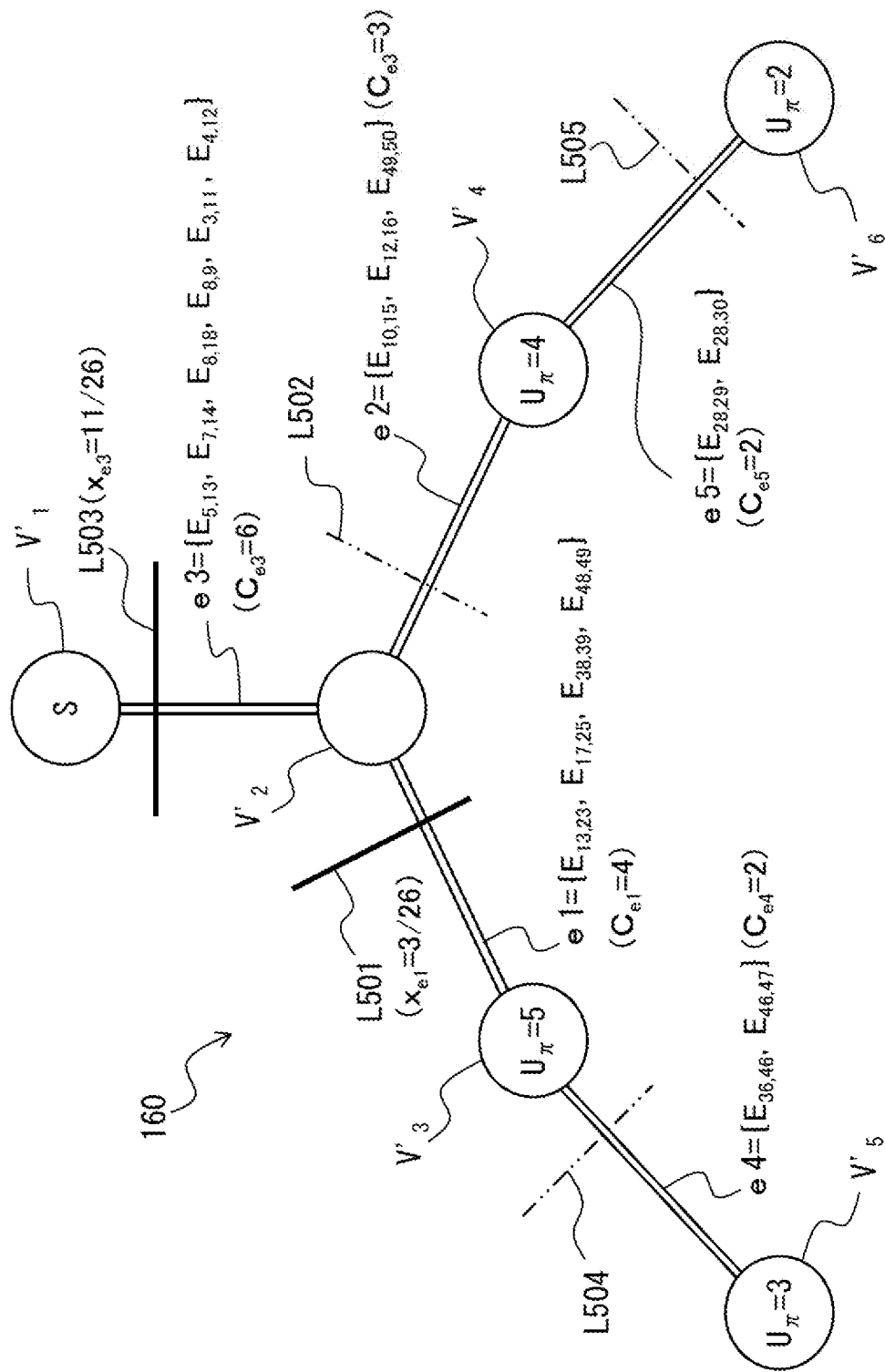
FIG. 13B is a schematic diagram illustrating a security area graph that is generated in the reference example and solutions of security probabilities.

FIG. 13A is a schematic diagram illustrating a reference example to be compared with the embodiments. FIG. 13B is a schematic diagram illustrating a security area graph that is generated in the reference example and solutions of security probabilities. Note that in FIG. 13B, only a portion of the closed curves L501-L505 illustrated in FIG. 13A is illustrated.

As a reference example for explaining effects of the security probability calculation method according to the embodiments, the following process will be described. In the reference example, a plurality of target subsets Tp that are not empty sets are selected from the set T of targets in the security graph 100, and then the minimum cut that separates the target subset Tp from the set S of sources is calculated for each target subset Tp. Then, a security area graph is generated by dividing the security graph 100 into a plurality of areas by the plurality of minimum cuts, and the optimization problem that is expressed by Formula (2) is solved.

As illustrated in FIG. 13A, the security graph 100 in the reference example is the same as the security graph 100 that has been illustrated so far, and the targets are the four vertices $V_{28}$, $V_{32}$, $V_{37}$, and $V_{46}$. Therefore, in the reference example, the target subset Tp is selected from the four targets. At that time, the maximum number of target subsets Tp is $2^4-1$, that is, 15.

When the minimum cut is calculated for each of the 15 target subsets Tp, the target subsets Tp are aggregated into five minimum cuts that are indicated, for example, by the closed curves L501, L502, L503, L504, and L505 illustrated in FIG. 13A. Note that in the same manner as the embodiment (first example), the closed curves L501 to L505 illustrated in FIG. 13A are obtained by selecting the minimum cuts that maximize the number of vertices which are included on the target side subset Tp.

When the security graph 100 is divided by the five closed curves L501-L505 illustrated in FIG. 13A and a security area graph is generated in the above manner, as illustrated in FIG. 13B, a security area graph 160 that includes six vertices $V'_1$, $V'_2$, $V'_3$, $V'_4$, $V'_5$, and $V'_6$ and four edges e1, e2, e3, and e4 is obtained.

In the security area graph 160 illustrated in FIG. 13B, the vertex $V'_1$ represents the set S of sources, and the vertex $V'_2$ represents an area which is separated from the other areas by the closed curves L501, L502, and L503 and in which there exists no targets. The vertex $V'_3$ represents an area that includes the vertex $V_{37}$ in the security graph 100, and the vertex $V'_4$ represents an area that includes the vertex $V_{32}$ in the security graph 100. The vertex $V'_5$ represents the vertex $V_{45}$ in the security graph, and the vertex $V'_5$ represents the vertex $V_{28}$ in the security graph. Therefore, the loss $U_\pi$ in a case in which the intruder has reached the vertex is set to each of the vertices $V'_3$, $V'_4$, $V'_5$, and $V'_6$.

The edge e1 that connects the vertices $V'_2$ and $V'_3$ represents a group of edges that the closed curve L501 crosses in the security graph 100. Therefore, the weight $C_{e1}$ of the edge e1 is 4. In addition, since the edge e2 that connects the vertices $V'_2$ and $V'_4$ represents a group of edges that the closed curve L502 crosses, the weight $C_{e2}$ of the edge e2 is 3. Similarly, the weight $C_{e3}$ of the edge e3 that connects the vertices $V'_1$ and $V'_2$ and the weight $C_{e4}$ of the edge e4 that connects the vertices $V'_3$ and $V'_5$, and the weight $C_{e5}$ of the edge e5 that connects the vertices $V'_4$ and $V'_6$ are 6, 2, and 2, respectively.

The number of security guards k=3 is added to the above described conditions, and the optimization problem expressed by the above Formula (2) is solved, and so, as illustrated in FIG. 13B, the security probability $x_{e1}$ of the edge e1 is 3/26 and the security probability $x_{e3}$ of the edge e3 is 11/26.

That is, the security probabilities that are provided last in the embodiment (first example) match the solutions of the optimization problem in the reference example. In the reference example, the minimum cut is calculated for each of the 15 target subsets Tp that are possible combinations of the targets. Therefore, it can be said that the reliability of the solutions of the optimization problem (security probabilities) is high. Thus, it can be said that the reliability of the security probabilities that are provided last in the embodiment (first example) is high.

In addition, in the above reference example, 15 calculations for obtaining the minimum cuts are performed. In contrast, in the embodiment (first example), 3 calculations for obtaining the minimum cuts are performed. Therefore, in the embodiment (first example), the number of calculations for obtaining the minimum cuts is reduced, and it is possible to ensure a reliability of the security probabilities that is equal to the reliability in the case of calculating the minimum cut for all the combinations of the target subset Tp. Particularly, in the above reference example, in a case in which the number of targets is t, $2^t-1$ target subsets Tp exist. Therefore, when the number of targets increases, the calculation amount of the minimum cuts increases exponentially, that is, the processing load of the device increases.

In addition, in the reference example, in a case in which the number of target subsets Tp for which the minimum cut is calculated is reduced, there is a possibility that a subset which is important in terms of security will not be included. In the case of solving the optimization problem in such a situation, optimum solutions that differ from the above solutions are obtained, and there is a risk of not being able to effectively deploy the security guards.

In contrast, in the embodiment, the process of focusing on the target that has the greatest degree of risk, calculating the minimum cut and the optimization problem, and reducing the degree of risk of the target is repeated. Therefore, it is possible to prevent a target that has a high degree of risk, which is important in terms of security, from not being selected and to provide a good security deployment.

Embodiment (Second Example)

Figure 15:
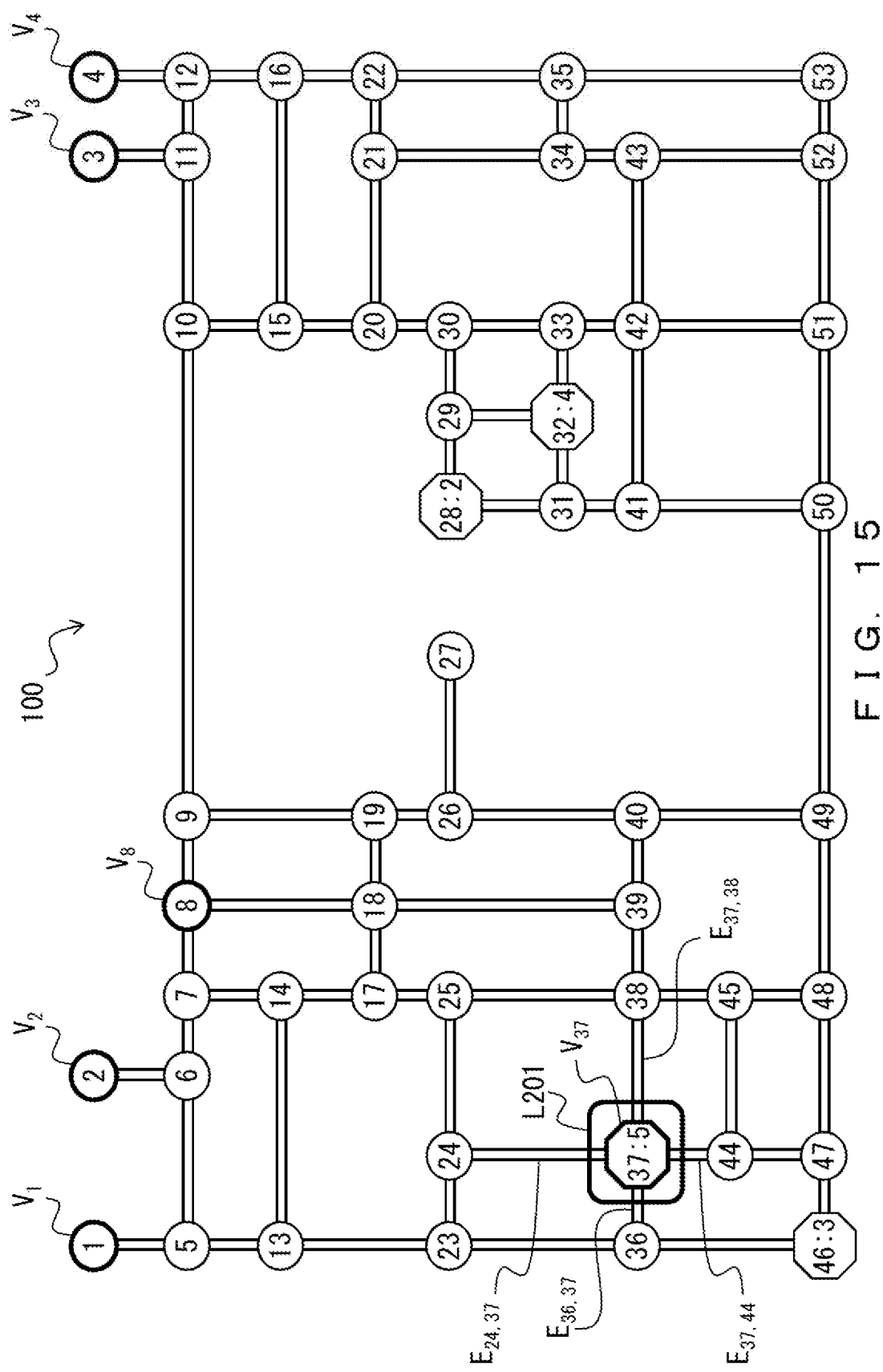
FIG. 15 is a schematic diagram illustrating the result of the process in the first performance of step S4 in the embodiment (second example).

FIG. 14 is a schematic diagram illustrating a calculation result of the degree of risk of each target in the embodiment (second example). FIG. 15 is a schematic diagram illustrating the result of the process in the first performance of step S4 in the embodiment (second example).

In the embodiment (second example), interim progress and the final result of the process in S4 will be described, the process being performed on condition that the minimum cut that minimizes the number of vertices V which are included on the side of the set T' of the target is selected in a case in which there exists a plurality of patterns of the calculated minimum cut.

Also in the embodiment (second example), at a time point when the process in step S3 is performed for the first time with respect to the security graph 100 in FIG. 1, the security plan X is an empty set and there exists no information of the security probability x.

Therefore, as illustrated in FIG. 14, the degrees of risk of the respective targets that are calculated in the process in step S3 for the first time are 2.000 ($V_{23}$), 4.000 ($V_{32}$), 5.000 ($V_{37}$), and 3.000 ($V_{45}$), respectively. Thus, the set T' of the target that has the greatest degree of risk in the process in step S3 for the first time is T'={$V_{37}$}.

Therefore, in the process in the next step S4, the minimum cut that separates the vertex $V_{37}$ from the set of sources S={$V_1$, $V_2$, $V_3$, $V_4$, $V_8$} is calculated. The size of the minimum cut at that time is 4, as illustrated in the embodiment (first example). Thus, in the embodiment (second example), the minimum cut whose size is 4 and which minimizes the number of vertices that are included on the side of the $V_{37}$ is selected. That is, in the embodiment (second example), the minimum cut that is indicated by the closed curve L201 illustrated in FIG. 15 and that separates only the vertex $V_{37}$ from the set of sources is selected.

In addition, in step S4, the edges that the closed curve L201 which indicates the calculated minimum cut crosses are added to the set E'. In the example illustrated in FIG. 15, the closed curve L201 crosses edges $E_{24,37}$, $E_{36,37}$, $E_{37,38}$, and $E_{37,44}$. Thus, as a result of the process in the first performance of step S4, a group of the above four edges E, e1(={$E_{24,37}$, $E_{36,37}$, $E_{37,38}$, $E_{37,44}$}) is added to the set E'.

Therefore, judgment in the next step S5 is "Yes" and the processes in steps S6 and S7 are subsequently performed.

In the first performance of step S6, the security graph 100 is divided into two areas by the closed curve L201, and as illustrated in FIG. 7B, a security area graph 150 is generated in which the divided two areas are set to vertices V'$_1$ and V'$_2$, respectively. Note that in the security graph 150 that is generated in the embodiment (second example), the elements of the edge e1 differ from the elements in the example illustrated in FIG. 7B, that is, e1={$E_{24,37}$, $E_{36,37}$, $E_{37,38}$, $E_{37,44}$}. In addition, in the security area graph 150 that is generated in the embodiment (second example), the closed curve L201 is used in lieu of the closed curve L101 in FIG. 7B.

The other conditions in the security area graph 150, the loss $U_\pi$ in a case in which the intruder has reached the vertex V'$_2$, the weight $C_{e1}$ of the edge e1, and the number k of security guards in the embodiment (second example) are the same as those in the embodiment (first example). Therefore, also in the embodiment (second example), when the optimization problem expressed by the above Formula (2) is solved in the first performance of step S7, then, the security probability $x_{e1}$ is 3/4 as illustrated in FIG. 7B.

As described above, in the first performance of the process in the embodiment (second example), the vertex $V_{37}$ is the only target that is included on the side of the target that has the greatest degree of risk.

Therefore, as a result of the process in the first performance of step S7, the security plan X is updated to information expressed, for example, by the following Formulas (8-1) to (8-3).

$$X=\{X1\} \quad (8\text{-}1)$$

$$X1=\{3/4,e1,V_{37}\} \quad (8\text{-}2)$$

$$e1=\{E_{24,37},E_{36,37},E_{37,38},E_{37,44}\} \quad (8\text{-}3)$$

As described, when the processes in the first performance of steps S3 to S7 are terminated, the process returns to step S3 and the second performance of the process is initiated.

Figure 16:
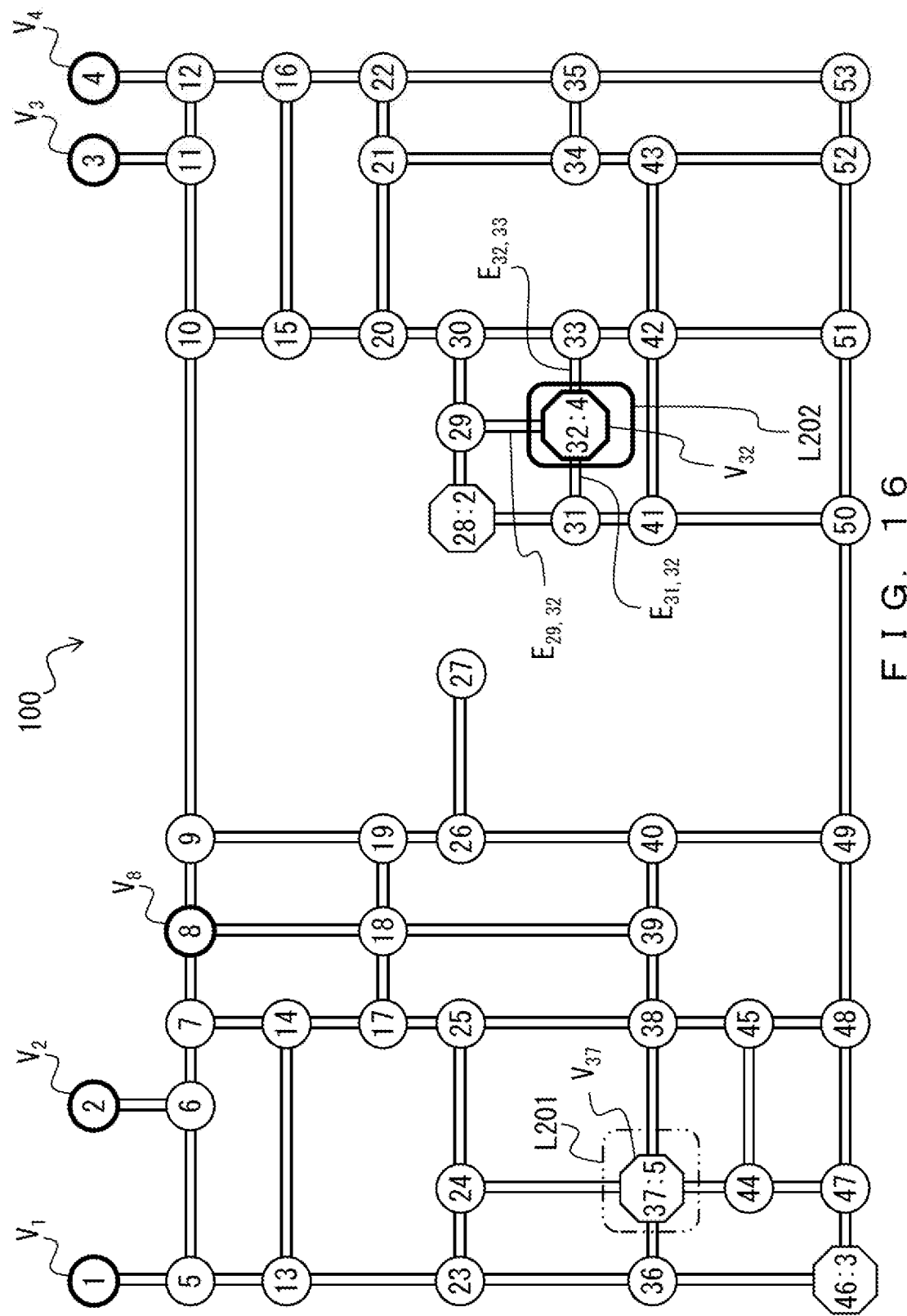
FIG. 16 is a schematic diagram illustrating the result of the process in the second performance of step S4 in the embodiment (second example).

FIG. 16 is a schematic diagram illustrating the result of the second performance of the process in step S4 in the embodiment (second example).

At a time point when the process in step S3 is performed for the second time, the security probability $x_{e1}$ (=3/4) that is associated with the vertex $V_{37}$ from among the four targets is stored in the security plan X. Therefore, when the degrees of risk of the respective targets are calculated in the process in the second performance of step S3, only the degree of risk of the vertex $V_{37}$ is reduced, and as illustrated in FIG. 14, the degrees of risk are 2.000 ($V_{23}$), 4.000 ($V_{32}$), 1.250 ($V_{37}$) and 3.000 ($V_{46}$). Thus, the set T' of the target that has the greatest degree of risk in the process in the second performance of step S3 is T'={$V_{32}$}.

The size of the minimum cut that separates the vertex $V_{32}$ from the set S of sources is 3, as illustrated in the embodiment (first example). Therefore, in the second performance of the process in step S4, the minimum cut that is indicated by the closed curve L202 illustrated in FIG. 16 and that separates the vertex $V_{32}$ from the set S of sources is selected. Consequently, a group of the three edges that the closed curve L102 crosses, e2(={$E_{29,32}$, $E_{31,32}$, $E_{32,33}$}) is added to the set E'. That is, the set E' is updated to information expressed by the following Formulas (9-1) to (9-3).

$$E'=\{e1,e2\} \quad (9\text{-}1)$$

$$e1=\{E_{24,37},E_{36,37},E_{37,38},E_{37,44}\} \quad (9\text{-}2)$$

$$e2=\{E_{29,32},E_{31,32},E_{32,33}\} \quad (9\text{-}3)$$

Therefore, judgment in the next step S5 is "Yes" and the processes in steps S6 and S7 are subsequently performed.

In the second performance of the process in step S6, according to the information expressed by Formulas (9-1) to (9-3), a security area graph 151 is generated that includes three vertices V'$_1$, V'$_2$, and V'$_3$ and two edges e1 and e2 illustrated in FIG. 8B. Note that in the security area graph 151 that is generated in the embodiment (second example), the elements of the edges e1 and e2 differ from the elements in the example illustrated in FIG. 7B, and are expressed by the Formulas (9-2) and (9-3), respectively.

The other conditions in the security area graph 150, a loss $U_\pi$ in a case in which the intruder has reached the vertex V'$_2$, the loss $U_\pi$ in a case in which the intruder has reached the vertex V'$_3$, a weight $C_{e1}$ of the edge e1, the weight $C_{e2}$ of the edge e2, and the number k of security guards in the embodiment (second example), are the same as those in the embodiment (first example). Therefore, also in the embodiment (second example), when the optimization problem expressed by the above Formula (2) is solved in the second performance of step S7, then, the security probability $x_{e1}$ of the edge e1 is 15/31 as illustrated in FIG. 8B. The security probability $x_{e2}$ of the edge e2 is 11/31.

Therefore, as a result of the second performance of the process in step S7, the security plan X is updated to information that is expressed, for example, by the following Formulas (10-1) to (10-5).

$$X=\{X1,X2\} \quad (10\text{-}1)$$

$$X1=\{15/31,e1,V_{37}\} \quad (10\text{-}2)$$

$$e1=\{E_{24,37},E_{36,37},E_{37,38},E_{37,44}\} \quad (10\text{-}3)$$

$$X2=\{11/31,e2,V_{32}\} \quad (10\text{-}4)$$

$$e2=\{E_{29,32},E_{31,32},E_{32,33}\} \quad (10\text{-}5)$$

As described, when the second performance of the processes in steps S3 to S7 are terminated, the process returns to step S3 and the third performance of the process is initiated.

Figure 17A:
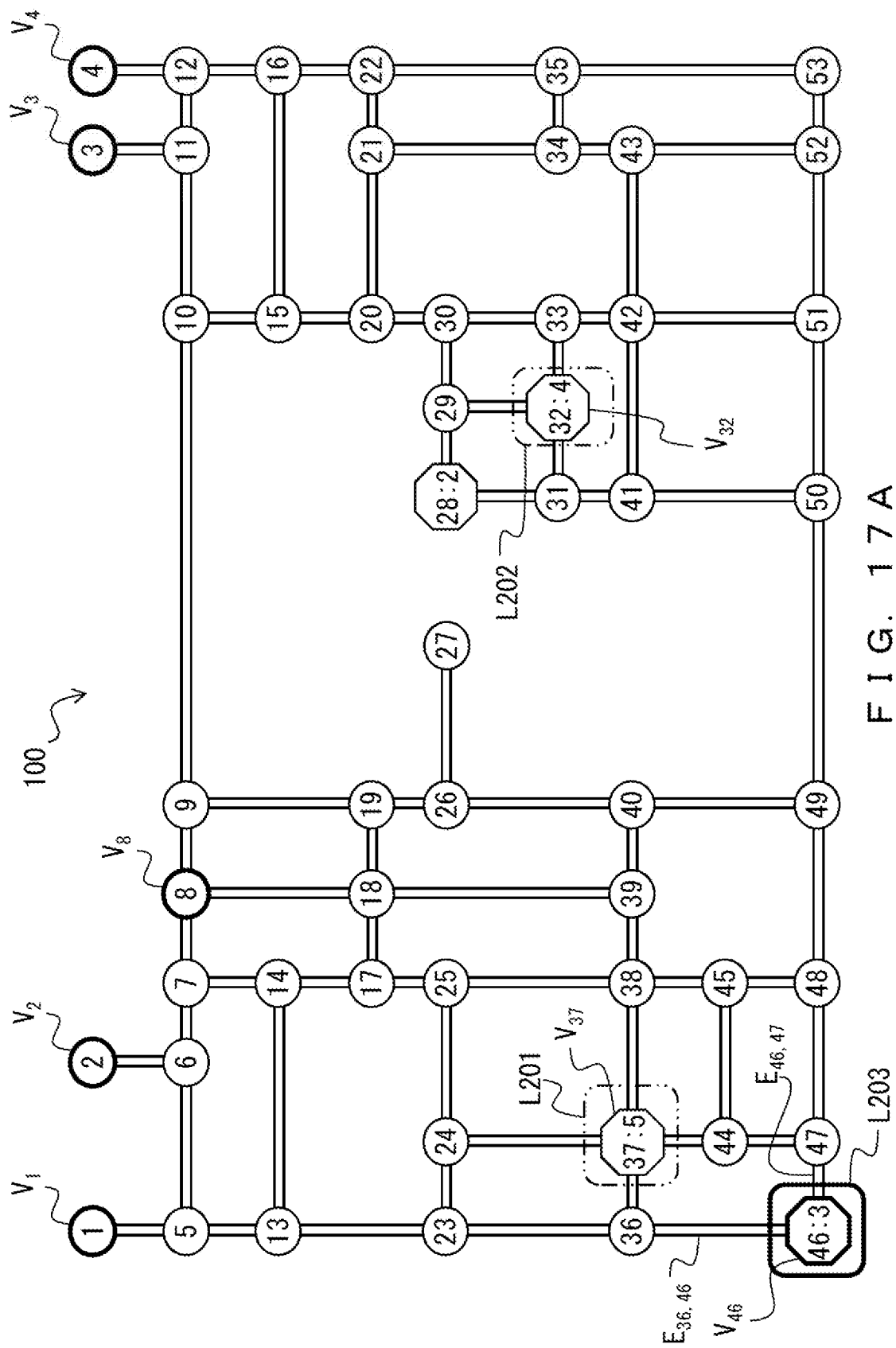
FIG. 17A is a schematic diagram illustrating the result of the process in the third performance of step S4 in the embodiment (second example).
Figure 17B:
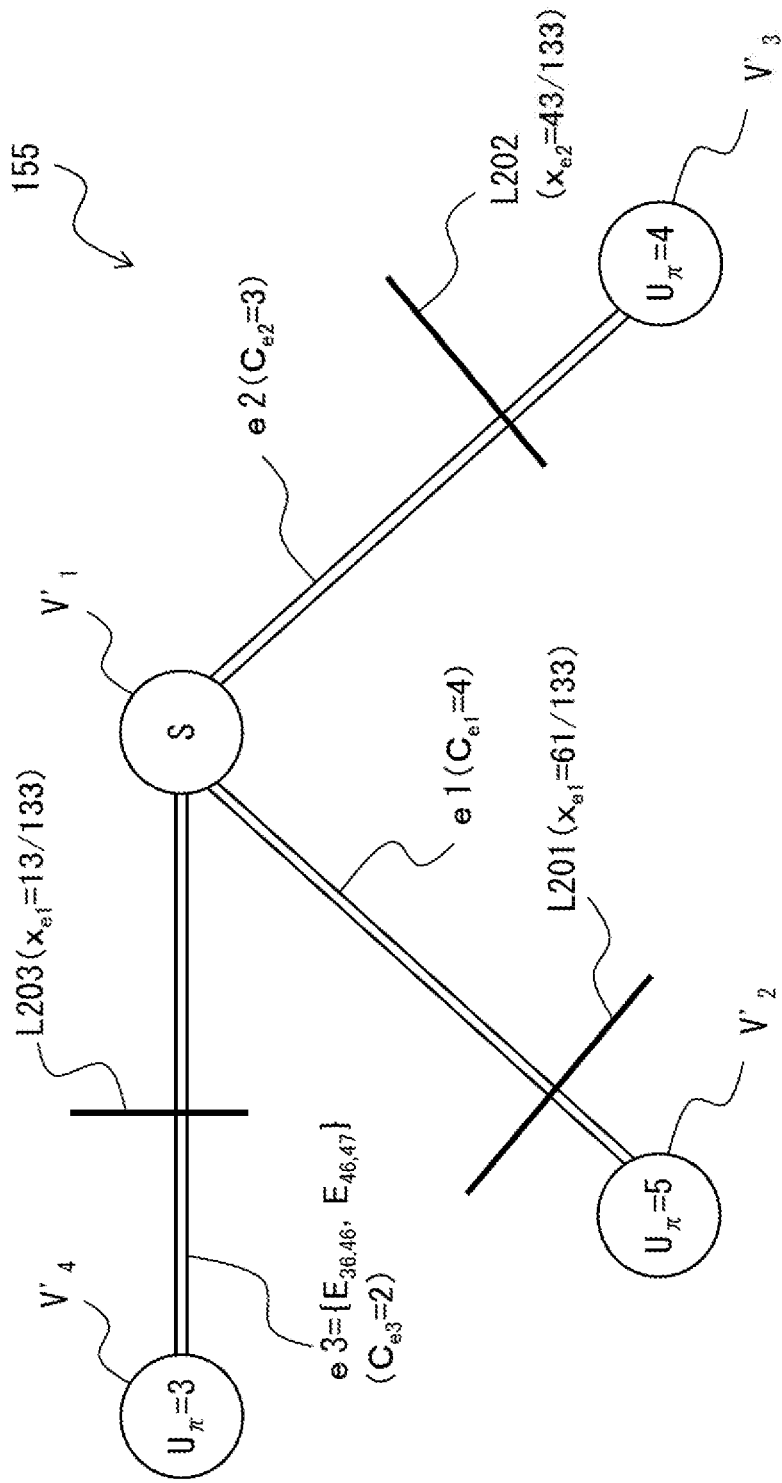
FIG. 17B is a schematic diagram illustrating the result of the processes in the third performance of steps S6 and S7 in the embodiment (second example).

FIG. 17A is a schematic diagram illustrating the result of the third performance of the process in step S4 in the embodiment (second example). FIG. 17B is a schematic diagram illustrating the result of the third performance of the processes in steps S6 and S7 in the embodiment (second example).

Note that in FIG. 17B, only a portion of the closed curves L201, L202, and L203 illustrated in FIG. 17A is illustrated.

At a time point when the process in step S3 is performed for the third time, the security probability $x_{e1}$ (=15/31) that is associated with the vertex $V_{37}$ and the security probability $x_{e2}$ (=11/31) that is associated with the vertex $V_{32}$ are stored in the security plan X. Therefore, when the degrees of risk of the respective targets are calculated in the third performance of the process in step S3, the degrees of risk are 2.000 ($V_{28}$), 2.581 ($V_{32}$), 2.581 ($V_{37}$), and 3.000 ($V_{45}$), respectively, as illustrated in FIG. 14. Thus, the set T' of the target that has the greatest degree of risk in the third performance of the process in step S3 is T'={$V_{46}$}.

As is clear from FIG. 17A, the size of the minimum cut that separates the vertex $V_{46}$ from the set S of sources is 2. Therefore, in the third performance of the process in step S4, the minimum cut that is indicated by the closed curve L203 and that separates only the vertex $V_{46}$ from the set S of sources is selected. Then, a group of the two edges that the closed curve L203 crosses, e3(={$E_{36,46}$, $E_{46,47}$}), is added to the set E'. That is, the set E' is updated to information expressed by the following Formulas (11-1) to (11-4).

$$E'=\{e1,e2,e3\} \quad (11\text{-}1)$$

$$e1=\{E_{24,37},E_{36,37},E_{37,38},E_{37,44}\} \quad (11\text{-}2)$$

$$e2=\{E_{29,32},E_{31,32},E_{32,33}\} \quad (11\text{-}3)$$

$$e3=\{E_{36,46},E_{46,47}\} \quad (11\text{-}4)$$

Therefore, judgment in the next step S5 is "Yes" and the processes in steps S6 and S7 are subsequently performed.

When the process in step S6 is performed for the third time, as described above, the set E' includes three elements, that is, e1 that represents the group of edges that the closed curve L201 crosses, e2 that represents the group of edges that the closed curve L202 crosses, and e3 that represents the group of edges that the closed curve L203 crosses. Therefore, in the third performance of the process in step S6, the security graph 100 is divided into four areas by the closed curves L201, L202 and L203, and a security area graph 155 is generated in which the divided four areas are set to vertices V'$_1$, V'$_2$, V'$_3$ and V'$_4$, respectively, as illustrated in FIG. 17B.

In the security area graph 155, the vertex V'$_1$ that connects to the three edges e1, e2, and e3 from among the four vertices represents the set S of sources. Since the vertex V'$_2$ that is connected to the vertex V'$_1$ by the edge e1 represents the vertex $V_{37}$ in the security graph 100, the loss $U_\pi$ in a case in which the intruder reaches the vertex V'$_2$ is 5 and the weight $C_{e1}$ of the edge e1 is 4. Since the vertex V'$_3$ that is connected to the vertex V'$_1$ by the edge e2 represents the vertex $V_{32}$ in the security graph 100, the loss $U_\pi$ in a case in which the intruder reaches the vertex V'$_3$ is 4 and the weight $C_{e2}$ of the edge e2 is 3. Since the vertex V'$_4$ that is connected to the vertex V'$_1$ by the edge e3 represents the vertex $V_{46}$ in the security graph 100, the loss $U_\pi$ in a case in which the intruder reaches the vertex V'$_4$ is 3 and the weight $C_{e3}$ of the edge e3 is 2.

The number of security guards k=3 is added to the above described conditions, and the optimization problem expressed by the above Formula (2) is solved, then, as illustrated in FIG. 17B, the security probability $x_{e1}$ of the edge e1 is 61/133, the security probability $x_{e2}$ of the edge e2 is 43/133, and the security probability $x_{e3}$ of the edge e3 is 13/133.

Therefore, in the second performance of the process in step S7, the security plan X is updated to information that is expressed, for example, by the following Formulas (12-1) to (12-7).

$$X=\{X1,X2,X3\} \quad (12\text{-}1)$$

$$X1=\{61/133,e1,V_{37}\} \quad (12\text{-}2)$$

$$e1=\{E_{24,37},E_{36,37},E_{37,38},E_{37,44}\} \quad (12\text{-}3)$$

$$X2=\{43/133,e2,V_{32}\} \quad (12\text{-}4)$$

$$e2=\{E_{29,32},E_{31,32},E_{32,33}\} \quad (12\text{-}5)$$

$$X3=\{13/133,e3,V_{46}\} \quad (12\text{-}6)$$

$$e3=\{E_{36,46},E_{46,47}\} \quad (12\text{-}7)$$

As described, when the third performance of the processes in steps S3 to S7 is terminated, the process returns to step S3 and a fourth performance of the process is initiated.

Figure 18A:
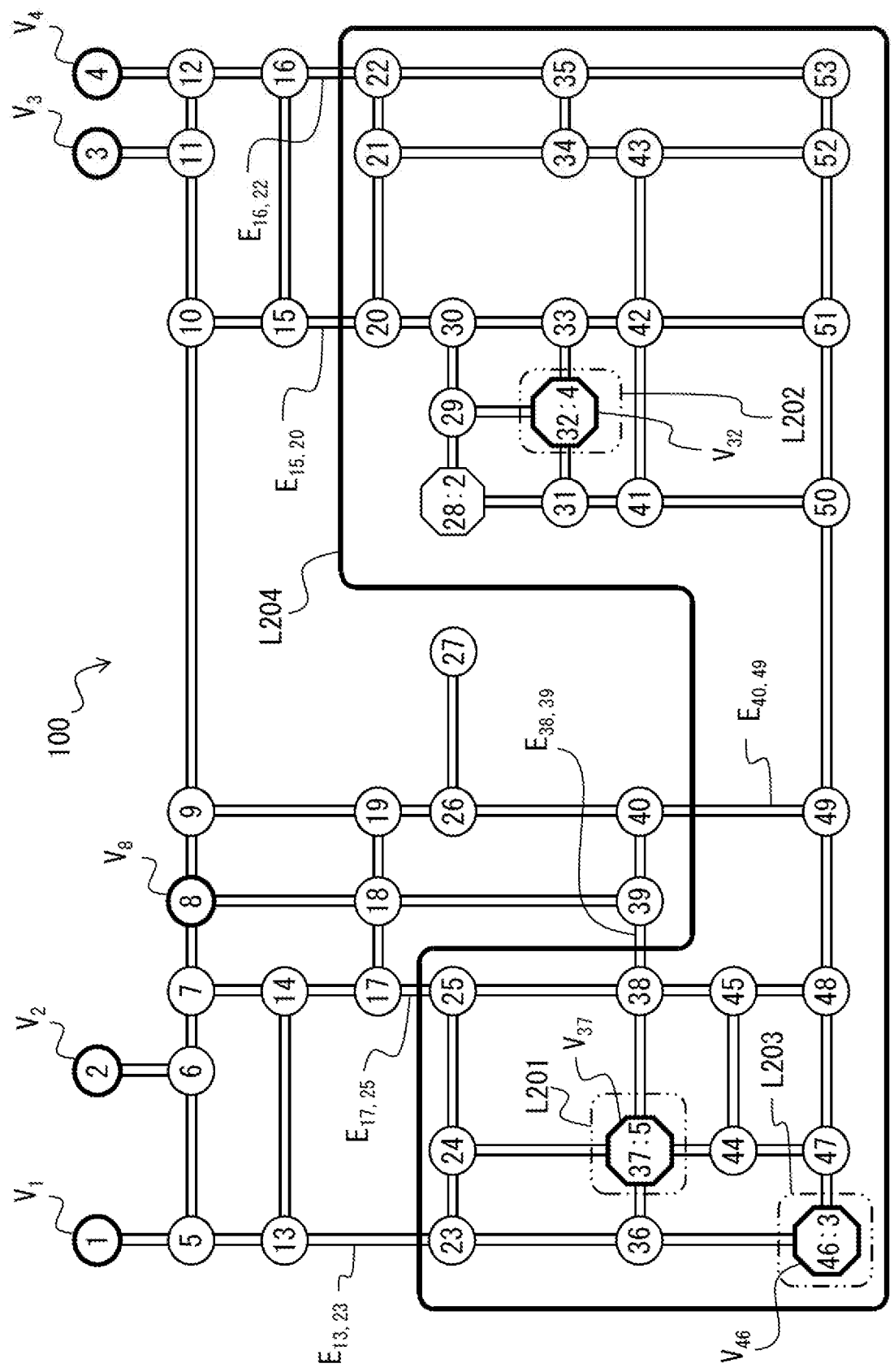
FIG. 18A is a schematic diagram illustrating the result of the process in the fourth performance of step S4 in the embodiment (second example).
Figure 18B:
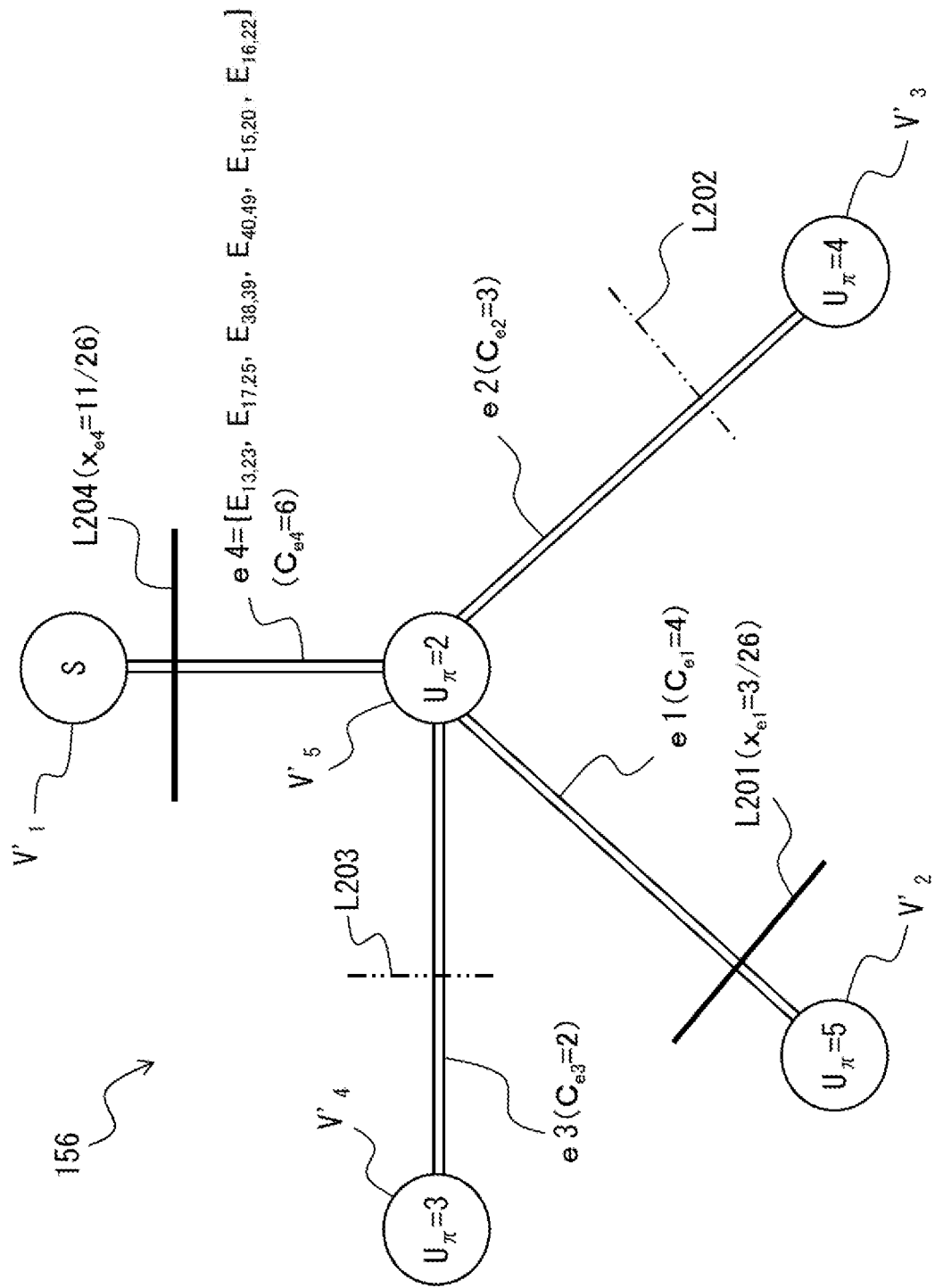
FIG. 18B is a schematic diagram illustrating the result of the processes in the fourth performance of steps S6 and S7 in the embodiment (second example).

FIG. 18A is a schematic diagram illustrating the result of the fourth performance of the process in step S4 in the embodiment (second example). FIG. 18B is a schematic diagram illustrating the result of the fourth performance of the processes in steps S6 and S7 in the embodiment (second example). Note that in FIG. 18B, only a portion of the closed curves L201 to L204 illustrated in FIG. 18A is illustrated.

At a time point when the process in step S3 is performed for the fourth time, the security probability $x_{e1}$ (=61/133) that is associated with the vertex $V_{37}$, the security probability $x_{e2}$ (=43/133) that is associated with the vertex $V_{32}$, and the security probability $x_{e3}$ (=13/133) that is associated with the vertex $V_{46}$ are stored in the security plan X. Therefore, as illustrated in FIG. 14, the degrees of risk of the respective targets that are calculated in the fourth performance of the process in step S3 are 2.000 ($V_{28}$), 2.707 ($V_{32}$), 2.707 ($V_{37}$), and 2.707 ($V_{46}$), respectively. Thus, the set T' of the targets that have the greatest degree of risk in the fourth performance of the process in step S3 is T'={$V_{32}$, $V_{37}$, $V_{46}$}.

Therefore, in the fourth performance of the process in step S4, the minimum cut that separates the three vertices $V_{32}$, $V_{37}$, and $V_{46}$ from the set S of sources is calculated. Even though a detailed description is omitted, the size of the minimum cut that separates the vertices $V_{32}$, $V_{37}$, and $V_{46}$ from the set S of sources is 6 and there exists a plurality of patterns of the minimum cut. Then, in step 4, as the minimum cut that minimizes the number of vertices that are included on the side of the set T', the minimum cut that is indicated by the closed curve L204 illustrated in FIG. 18A and that cuts the six edges $E_{13,23}$, $E_{17,25}$, $E_{33,39}$, $E_{40,49}$, $E_{15,20}$, and $E_{16,22}$ is selected.

In addition, in step S4, a group of the six edges that the closed curve L204 crosses, e4(={$E_{13,23}$, $E_{17,25}$, $E_{33,39}$, $E_{40,49}$, $E_{15,20}$, $E_{16,22}$}), is added to the set E'. That is, the set E' is updated to information expressed by the following Formulas (13-1) to (13-5).

$$E' = \{e1, e2, e3, e4\} \quad (13\text{-}1)$$

$$e1 = \{E_{24,37}, E_{36,37}, E_{37,38}, E_{37,44}\} \quad (13\text{-}2)$$

$$e2 = \{E_{29,32}, E_{31,32}, E_{32,33}\} \quad (13\text{-}3)$$

$$e3 = \{E_{36,46}, E_{46,47}\} \quad (13\text{-}4)$$

$$e4 = \{E_{13,23}, E_{17,25}, E_{38,39}, E_{40,49}, E_{15,20}, E_{16,22}\} \quad (13\text{-}5)$$

Therefore, judgment in the next step S5 is "Yes" and the processes in steps S6 and S7 are subsequently performed.

When the process in step S6 is performed for the fourth time, the set E' includes four elements, that is, e1 that represents the group of edges that the closed curve L201 crosses, e2 that represents the group of edges that the closed curve L202 crosses, e3 that represents the group of edges that the closed curve L203 crosses, and e4 that represents the group of edges that the closed curve L204 crosses. Therefore, in the fourth performance of the process in step S6, the security graph 100 is divided into five areas by the closed curves L201, L202, L203, and L204 and a security area graph 156 is generated in which the divided five areas are set to vertices $V'_1$, $V'_2$, $V'_3$, $V'_4$ and $V'_5$, respectively, as illustrated in FIG. 18B.

In the security area graph 156, from among the five vertices, the vertex $V'_5$ that four edges e1, e2, e3, and e4 are incident to represents an area that is separated from the set S of sources and the vertices $V_{37}$, $V_{28}$, and $V_{32}$. As illustrated in FIG. 18A, in the area that corresponds to the vertex $V'_5$ in the security graph 100, the target ($V_{28}$) exists. Therefore, 2 is set to the vertex $V'_5$ as the loss $U_\pi$. The vertex $V'_1$ that is connected to the vertex $V'_5$ by the edge e4 represents the set S of sources. Consequently, the loss $U_\pi$ is not set to the vertex $V'_1$. In addition, since the vertex $V'_2$ that is connected to the vertex $V'_5$ by the edge e1 represents the vertex $V_{37}$, the loss $U_\pi$ in a case in which the intruder has reached the vertex $V'_2$ is 5 and the weight $C_{e1}$ of the edge e1 is 4. Since the vertex $V'_3$ that is connected to the vertex $V'_5$ by the edge e2 represents the vertex $V_{32}$, the loss $U_\pi$ in a case in which the intruder has reached the vertex $V'_3$ is 4, and the weight $C_{e2}$ of the edge e2 is 3. Since the vertex $V'_4$ that is connected to the vertex $V'_5$ by the edge e3 represents the vertex $V_{45}$, the loss $U_\pi$ in a case in which the intruder has reached the vertex $V'_4$ is 3 and the weight $C_{e3}$ of the edge e3 is 2.

The number of security guards k=3 is added to the above described conditions, and the optimization problem expressed by the above Formula (2) is solved, then, as illustrated in FIG. 18B, the security probability $x_{e1}$ of the edge e1 is 3/26 and the security probability $x_{e4}$ of the edge e4 is 11/26.

Therefore, in the fourth performance of the process in step S7, the security plan X is updated to information that is expressed by the following Formulas (14-1) to (14-5).

$$X = \{X1, X4\} \quad (14\text{-}1)$$

$$X1 = \{3/26, e1, V_{37}\} \quad (14\text{-}2)$$

$$e1 = \{E_{24,37}, E_{36,37}, E_{37,38}, E_{37,44}\} \quad (14\text{-}3)$$

$$X4 = \{11/26, e4, V_{28}, V_{37}, V_{46}\} \quad (14\text{-}4)$$

$$e4 = \{E_{13,23}, E_{17,25}, E_{38,39}, E_{40,49}, E_{15,20}, E_{16,22}\} \quad (14\text{-}5)$$

As described, when the fourth performance of the processes in steps S3 to S7 are terminated, the process returns to step S3 and a fifth performance of the process is initiated.

At a time point when the process in step S3 is performed for the fifth time, the security probability $x_{e1}$ (=3/26) that is associated with the vertex $V_{37}$ and the security probability $x_{e4}$ (=11/26) that is associated with the vertices $V_{28}$, $V_{32}$, $V_{37}$, and $V_{46}$ are stored in the security plan X. Therefore, as illustrated in FIG. 14, the degrees of risk of the respective targets that are calculated in the fifth performance of the process in step S3 are 1.154 ($V_{28}$), 2.308 ($V_{32}$), 2.308 ($V_{37}$), and 1.385 ($V_{46}$), respectively. Thus, the set T' of the targets that have the greatest degree of risk in the fifth performance of the process in step S3 is T'=$\{V_{32}, V_{37}\}$.

That is, in the fifth performance of the process in step S4, in the same manner as in the third performance of the process in step S4 in the embodiment (first example), the minimum cut that separates the two vertices $V_{32}$ and $V_{37}$ from the set S of sources is calculated. As described in the embodiment (first example), the size of the minimum cut that separates the two vertices $V_{32}$ and $V_{37}$ from the set S of sources is 6. This is the same as the size of the minimum cut in the fourth performance of the process in the embodiment (second example). Therefore, in the fifth performance of the process in step S4, the minimum cut that is indicated by the closed curve L204 that is the same as that in the fourth performance is selected. Consequently, no new elements are added to the set E' in the fifth performance of step S4. Thus, the judgement in step S5 is "No" and then the process in step S8 is performed.

Figure 19:
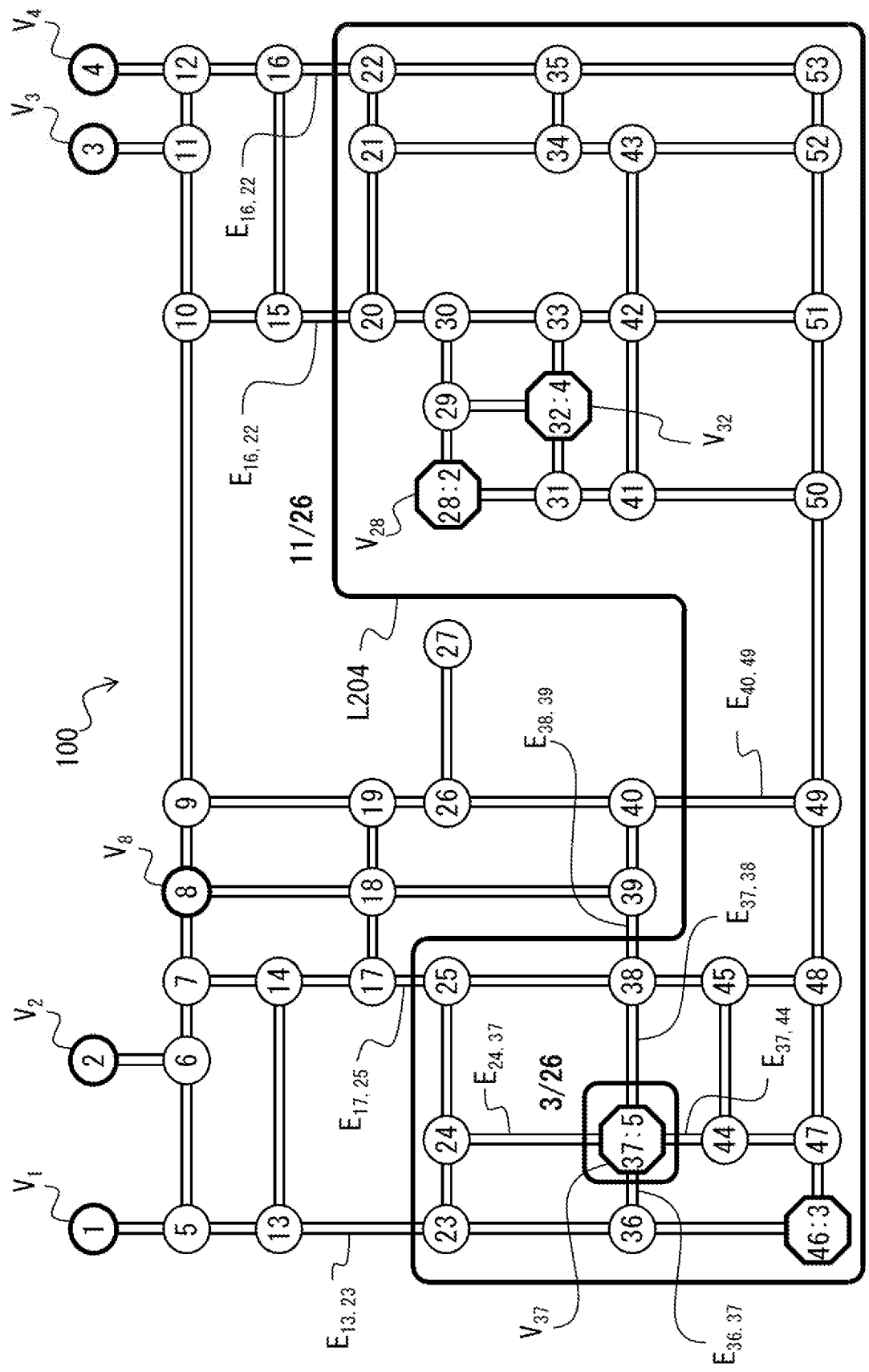
FIG. 19 is a schematic diagram illustrating a display example of the security plan information according to the embodiment (second example).

FIG. 19 is a schematic diagram illustrating a display example of the security plan information according to the embodiment (second example).

In step S8, as described above, information of the security plan X (security plan information) is added to the security graph 100 and is displayed on the display device 4.

Information of the security plan X at the time point of performing the process in step S8 is the information that is updated in the process in step S7 for the fourth time and that is expressed by the above Formulas (14-1) to (14-5). From among the formulas, Formula (14-3) expresses the group of edges that the closed curve L201 which indicates the minimum cut that has been calculated in step S4 for the first time crosses. In addition, Formula (14-5) expresses the group of edges that the closed curve L204 which indicates the minimum cut that has been calculated in step S4 for the fourth time crosses.

Therefore, in step S8, as illustrated in FIG. 19, an image that is obtained by overlapping the closed curves L201 and L204 which serve as security lines on the security graph 100 is displayed on the display device 4. At that time, the security probability $x_{e1}$ (=3/26) with respect to the edge e1 that the closed curve L201 crosses is displayed in the vicinity of the closed curve L201. Similarly, the security probability $x_{e4}$ (=11/26) with respect to the edge e4 that the closed curve L104 crosses is displayed in the vicinity of the closed curve L104.

As can be seen from FIG. 19, the security line (closed curve L201, L204) crosses the routes (edges) that allow the intruder to head for a target (security target) within an area that is surrounded by the security line from outside the area. In addition, the security line is obtained according to the minimum cut that separates a specified target from the set S of sources. Therefore, by looking at the security lines in the security plan information illustrated in FIG. 19, it can be easily understood that that the security lines indicate an efficient deployment of the security guards with respect to, for example, the vertices $V_{37}$ and $V_{46}$.

In addition, when the optimization problem expressed by Formula (2) is solved and the security lines are specified, $C_e$ edges of the security model 100 that one security line crosses are selected with the same security probability $X_e$. Therefore, by displaying security probabilities (for example, 3/26 and 11/26) in the vicinities of the security lines, efficient deployment of the three security guards with respect to the security graph 100 illustrated in FIG. 19 is easily grasped. In the example illustrated in FIG. 19, it is easily understood that security may be provided by changing deployment locations of the three security guards so that the frequency of deploying the security guards on the edges that the closed curve L201 crosses is 3/26 and the frequency of deploying the security guards on the edges that the closed curve L204 crosses is 11/26.

Therefore, according to the embodiment (second example), the deployment locations of the security guards and the reason why it is preferable to deploy the security guards at the deployment locations can be easily understood, and the appropriateness of the security plan is more easily evaluated.

Furthermore, since the security probability is obtained according to the rule that the degree of risk of the target that has the greatest degree of risk be reduced, it is possible to easily explain the rule in the case of asking a third party such as an expert for an appropriateness evaluation. In addition, since the rule itself is simple, it is easy for the third party such as an expert to evaluate an appropriateness of the security plan.

In addition, the security probability is obtained according to the rule that the degree of risk of the target that has the greatest degree of risk be reduced, and the security plan information that is finally provided be similar to the security plan information that is provided in the embodiment (first example) (see FIG. 10). Therefore, it is possible to suppress an increase in the processing load of the security plan support device due to an increase in the calculation amount, and furthermore, points that are important in terms of security will not be overlooked.

As described above, in the security probability calculation method and device according to the embodiment, the security probability is calculated according to the minimum cut that separates the target that has the greatest degree of risk and the set S of sources in the security graph, and the line that indicates the minimum cut and the security probability are provided so as to overlap the security graph. Therefore, it can be intuitively understood that it is possible to efficiently provide security by deploying according to the security probability the security guards on the edges that the line which indicates the minimum cut crosses.

In addition, the calculation of the minimum cut and the security probability is repeated, adding to the set E' the group of edges that the line which indicates the minimum cut crosses (minimum cut set) every time the minimum cut is calculated. When there exist no groups of edges to be newly added to the set E', the calculation of the minimum cut and the security probability is terminated. That is, when there is no change in the minimum cut that separates the target that has the greatest degree of risk from the set of sources, the calculation of the minimum cut and the security probability is terminated. Therefore, even though the number of calculations of the minimum cut is less than the case of calculating the minimum cut for all the conceivable combinations of the target subset, there is no significant difference between the security probability, etc. that is obtained in the embodiment and the security probability, etc. that is obtained in this case. In addition, since the process for reducing the degree of risk of the target that has the greatest degree of risk is repeated, points that are important in terms of security will not be overlooked as in the case of selecting an arbitrary subset from all the conceivable combinations of the target subset. Thus, according to the security probability calculation method and device according to the embodiment, it is possible to suppress an increase in the processing load (calculation load) of the security plan support device and to provide highly reliable security plan information in a short time.

Furthermore, the security graph is divided into a plurality of areas by the minimum cut, the security area graph in which each area is set to a new vertex is generated, and the optimization problem with respect to the security probability is solved on the security area graph. Therefore, even when the security graph has complex movement routes, the security graph may be simplified into a security area graph that has fewer vertices and the optimization problem may be solved. In addition, in the case of separating a target using the minimum cut, in order for an intruder to reach the security target (target) from an intrusion position (source), the intruder has to pass at least one of the edges that the line (security line) which indicates the minimum cut crosses. Therefore, by solving the optimization problem of the security probability of the edge of the security graph that corresponds to the edges which the minimum cut crosses, it is possible to selectively extract deployment locations that are efficient in terms of security and to calculate the security probability. Thus, it is possible to reduce the processing load of the security plan support device.

In addition, in a case in which a plurality of patterns of the calculated minimum cut exists, one of the minimum cuts may be arbitrarily selected and may be selected according to conditions that are determined in advance. However, in terms of reducing the number of calculations of the minimum cut, as in the embodiment (first example), it is preferable to select a minimum cut that maximizes the number of vertices that are included on the side of the target that has the greatest degree of risk when the target is separated from the set S of sources. In addition, in a case in which there exists a plurality of patterns of the minimum cut, for example, the process may be interrupted, and the plurality of patterns of the minimum cut may be displayed on the display device 4 so as to overlap the security graph 100, and may be selected by an operator.

In addition, in the embodiment, an example of solving the optimization problem expressed by the following Formula (2) and calculating the security probability of the security area graph (security graph 100) has been described. However, the security plan support method and device according to the embodiments are not limited to this. For example, the probability of an intruder intruding into the target side may be calculated on the security area graph and provided, or the security probability may be calculated according to the probability of intrusion and provided.

Furthermore, in the embodiment, the security graph 100 is simplified into the security area graph that is obtained by dividing the security graph 100 into a plurality of areas and setting each area to a new vertex. However, the embodiments are not limited to this, and the security graph 100 may be simplified using another method and the security probability or the probability of the intruder intruding into the target side may be calculated on the simplified security graph.

According to the above described aspect, it is possible to reduce the load of calculating the probability with respect to deployment of security guards.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A security plan support method that supports determination of deployment of security guards within a security area, the method comprising performing, by a processor, a process including:
    generating, using route information for the security area, a movement route graph including a plurality of nodes and edges, with the nodes associated with security targets and intrusion-allowing positions and with the edges associated with movement-allowing routes within the security area, the route information being stored in a route information storage;
    setting a loss that may be caused on each of the security targets when an intruder reaches the security target, the loss being set, as an initial value for a degree of risk, for each node associated with its corresponding security target in the movement route graph;
    generating a closed curve that separates a first set of nodes from a second set of nodes in the movement route graph by crossing edges of the movement route graph by the closed curve, the first set of nodes including a node as the security target for which a highest degree of risk has been set in the setting, the second set of nodes including all nodes at the intrusion-allowing positions, and the closed curve crossing a minimum number of the edges of the movement route graph;
    generating a security region graph in which the first set of nodes and the second set of nodes are respectively associated with nodes in a pair of the security region graph, the highest degree of risk being set for one of the nodes in the pair that is associated with the first set of nodes, a number of the edges of the movement route graph that the closed curve crosses being set as a weight for an edge connecting the nodes in the pair;
    solving an optimization problem about a security probability of each edge of the security region graph by using the degree of risk and the weight of the edge set in the security region graph as well as a number of the security guards, and updating, based on an optimum solution of the security probability, a degree of risk set for a node as each security target included in the first set of nodes including the node as the security target for which the highest degree of risk has been set in the movement route graph;
    further generating the closed curve in the movement route graph after the updating of the degree of risk;
    determining whether an edge that is not an edge crossed by each closed curve generated in a past exists, in the movement route graph, from among edges crossed by the further-generated closed curve;
    when determining that an edge that is not an edge crossed by each closed curve generated in the past exists, repeating the generation of the security region graph based on the further-generated closed curve, the update of the degree of risk, the generation of the closed curve, and the determination about the generated closed curve;
    when determining that an edge that is not an edge crossed by each closed curve generated in the past does not exist, terminating the repeating; and
    after the terminating, controlling a display device so that the display device displays each closed curve generated in the past in the movement route graph and the display device displays, in association with each closed curve being displayed, an optimum solution of the security probability obtained for the security region graph generated for each closed curve being displayed.

2. The security plan support method according to claim 1, wherein
    in a case in which there exists a plurality of the closed curves that cross a minimum number of edges of the movement route graph in the generation of the closed curve, one of the closed curves is selected according to a condition that is determined in advance.

3. The security plan support method according to claim 1, wherein in a case in which there exists a plurality of the closed curves that crosses a minimum number of edges of the movement route graph in the generation of the closed curve, a closed curve is selected, the selected closed curve maximizing a number of nodes included in the first set of nodes.

4. A security plan support apparatus that supports determination of deployment of security guards within a security area, the apparatus comprising:
    a processor that executes a process including:
        generating, using route information for the security area, a movement route graph including a plurality of nodes and edges, with the nodes associated with security targets and intrusion-allowing positions and with the edges associated with movement-allowing routes within the security area, the route information being stored in a route information storage;
        setting a loss may be caused on each of the security targets when an intruder reaches the security target, the loss being set, as an initial value for a degree of risk, for each node associated with its corresponding security target in the movement route graph;
        generating a closed curve that separates a first set of nodes from a second set of nodes in the movement route graph by crossing edges of the movement route graph by the closed curve, the first set of nodes including a node as the security target for which a highest degree of risk has been set in the setting, the second set of nodes including all nodes at the intrusion-allowing positions, and the closed curve crossing a minimum number of the edges of the movement route graph;
        generating a security region graph in which the first set of nodes and the second set of nodes are respectively associated with nodes in a pair of the security region graph, the highest degree of risk being set for one of the nodes in the pair that is associated with the first set of nodes, a number of the edges of the movement route graph that the closed curve crosses being set as a weight for an edge connecting the nodes in the pair;
        solving an optimization problem about a security probability of each edge of the security region graph by using the degree of risk and the weight of the edge set in the security region graph as well as a number of the security guards, and updating, based on an optimum solution of the security probability, a degree of risk set for a node as each security target included in the first set of nodes including the node as the security target for which the highest degree of risk has been set in the movement route graph;

further generating the closed curve in the movement route graph after the updating of the degree of risk;

determining whether an edge that is not an edge crossed by each closed curve generated in a past exists, in the movement route graph, from among edges crossed by the further-generated closed curve;

when determining that an edge that is not an edge crossed by each closed curve generated in the past exists, repeating the generation of the security region graph based on the further-generated closed curve, the update of the degree of risk, the generation of the closed curve, and the determination about the generated closed curve;

when determining that an edge that is not an edge crossed by each closed curve generated in the past does not exist, terminating the repeating; and after the terminating, controlling a display device so that the display device displays each closed curve generated in the past in the movement route graph and the display device displays, in association with each closed curve being displayed, an optimum solution of the security probability obtained for the security region graph generated for each closed curve being displayed.

5. A non-transitory computer-readable recording medium having stored therein a program that causes a computer to execute a process to support determination of deployment of security guards within a security area, the process comprising:

generating, using route information for the security area, a movement route graph including a plurality of nodes and edges, with the nodes associated with security targets and intrusion-allowing positions and with the edges associated with movement-allowing routes within the security area, the route information being stored in a route information storage;

setting a loss that may be caused on each of the security targets when an intruder reaches the security target, the loss being set, as an initial value for a degree of risk, for each node associated with its corresponding security target in the movement route graph;

generating a closed curve that separates a first set of nodes from a second set of nodes in the movement route graph by crossing edges of the movement route graph by the closed curve, the first set of nodes including a node as the security target for which a highest degree of risk has been set in the setting, the second set of nodes including all nodes at the intrusion-allowing positions, and the closed curve crossing a minimum number of the edges of the movement route graph;

generating a security region graph in which the first set of nodes and the second set of nodes are respectively associated with nodes in a pair of the security region graph, the highest degree of risk being set for one of the nodes in the pair that is associated with the first set of nodes, a number of the edges of the movement route graph that the closed curve crosses being set as a weight for an edge connecting the nodes in the pair;

solving an optimization problem about a security probability of each edge of the security region graph by using the degree of risk and the weight of the edge set in the security region graph as well as a number of the security guards, and updating, based on an optimum solution of the security probability, a degree of risk set for a node as each security target included in the first set of nodes including the node as the security target for which the highest degree of risk has been set in the movement route graph;

further generating the closed curve in the movement route graph after the updating of the degree of risk;

determining whether an edge that is not an edge crossed by each closed curve generated in a past exists, in the movement route graph, from among edges crossed by the further-generated closed curve;

when determining that an edge that is not an edge crossed by each closed curve generated in the past exists, repeating the generation of the security region graph based on the further-generated closed curve, the update of the degree of risk, the generation of the closed curve, and the determination about the generated closed curve;

when determining that an edge that is not an edge crossed by each closed curve generated in the past does not exist, terminating the repeating; and after the terminating, controlling a display device so that the display device displays each closed curve generated in the past in the movement route graph and the display device displays, in association with each closed curve being displayed, an optimum solution of the security probability obtained for the security region graph generated for each closed curve being displayed.

* * * * *